US006834388B1

(12) United States Patent
Elsbree

(10) Patent No.: US 6,834,388 B1
(45) Date of Patent: Dec. 21, 2004

(54) PROCESS CONTROL

(75) Inventor: Christopher N. Elsbree, Plainville, MA (US)

(73) Assignee: Iconics, Inc., Foxborough, MA (US)

( * ) Notice: Subject to any disclaimer, the term of this patent is extended or adjusted under 35 U.S.C. 154(b) by 0 days.

(21) Appl. No.: 09/267,204

(22) Filed: Mar. 12, 1999

Related U.S. Application Data

(60) Provisional application No. 60/077,843, filed on Mar. 13, 1998, and provisional application No. 60/079,355, filed on Mar. 25, 1998.

(51) Int. Cl.[7] .............................................. G06F 9/00
(52) U.S. Cl. ...................... 719/316; 719/315; 719/332
(58) Field of Search ................................ 709/311, 315, 709/318, 320, 321, 328

(56) References Cited

U.S. PATENT DOCUMENTS

| | | | | |
|---|---|---|---|---|
| 4,141,066 A | 2/1979 | Keiles | ......................... | 364/119 |
| 5,652,908 A | 7/1997 | Douglas et al. | ............. | 395/800 |
| 5,671,415 A | 9/1997 | Hossain | ....................... | 395/701 |
| 5,726,912 A | 3/1998 | Krall, Jr. et al. | ............ | 364/550 |
| 5,812,668 A | 9/1998 | Weber | .......................... | 380/24 |
| 5,815,657 A | 9/1998 | Williams et al. | ............ | 395/186 |
| 5,818,447 A | 10/1998 | Wolf et al. | .................. | 345/335 |
| 5,828,674 A | 10/1998 | Proskauer | ................... | 371/22.1 |
| 5,828,840 A | 10/1998 | Cowan et al. | .............. | 395/200 |
| 5,835,914 A | 11/1998 | Brim | ........................... | 707/206 |
| 5,850,446 A | 12/1998 | Berger et al. | ................. | 380/24 |
| 5,867,153 A | 2/1999 | Grandcolas et al. | ........ | 345/326 |
| 5,889,516 A | 3/1999 | Hickey et al. | .............. | 345/333 |
| 5,910,895 A | 6/1999 | Proskauer et al. | ..... | 364/468.28 |
| 5,938,781 A | 8/1999 | Proskauer | ................... | 714/724 |
| 6,032,203 A | 2/2000 | Heidhues | ..................... | 710/11 |
| 6,131,122 A | 10/2000 | Sampson | .................... | 709/227 |
| 6,141,005 A | 10/2000 | Hetherington et al. | ...... | 345/333 |
| 6,151,625 A | 11/2000 | Swales et al. | .............. | 709/218 |
| 6,188,401 B1 | 2/2001 | Peyer | ......................... | 345/335 |
| 6,259,448 B1 | 7/2001 | McNally et al. | ............ | 345/348 |
| 6,313,851 B1 | 11/2001 | Matthews, III et al. | ..... | 345/718 |
| 6,330,005 B1 | 12/2001 | Tonelli et al. | .............. | 345/735 |
| 6,341,306 B1 | 1/2002 | Rosenschein et al. | ....... | 709/217 |
| 6,349,410 B1 | 2/2002 | Lortz | .......................... | 725/110 |
| 6,380,959 B1 | 4/2002 | Wang et al. | ................. | 345/853 |
| 6,389,464 B1 | 5/2002 | Krishnamurthy et al. | ... | 709/220 |
| 6,441,834 B1 | 8/2002 | Agassi et al. | ............... | 345/764 |
| 6,456,307 B1 | 9/2002 | Bates et al. | ................. | 345/838 |
| 6,466,203 B2 | 10/2002 | Van Ee | ....................... | 345/173 |
| 6,477,565 B1 | 11/2002 | Daswani et al. | ............ | 709/217 |

FOREIGN PATENT DOCUMENTS

| | | | | |
|---|---|---|---|---|
| EP | 0 266 784 A2 | 5/1988 | ......... | G05B/19/417 |
| EP | 0 460 308 A1 | 12/1991 | ........... | G06F/11/14 |
| EP | 0 566 283 A2 | 10/1993 | ........... | G05B/19/00 |
| EP | 07 762 273 A1 | 3/1997 | | |
| EP | 0 778 688 A2 | 6/1997 | ........... | H04L/29/06 |
| EP | 0 810 499 A2 | 12/1997 | ......... | G05B/19/418 |
| EP | 0 825 506 A2 | 2/1998 | | |
| WO | 97/00475 | 1/1997 | ............. | G06F/9/46 |

OTHER PUBLICATIONS

Steve Robinson and Alex Krasilshchikov, ActiveX Magic: An ActiveX Control and DCOM Sample Using ATL, May 1997, downloaded Mar. 12, 1998 from http://www.microsoft.com/com/overview.htm, 11 pages.

Press Release, ICONICS GraphWorX32 Awarded Prestigious *Control Engineering* 1997 Editorss' Choice Award, Feb. 27, 1998, downloaded Mar. 12, 1998 from http://www.iconics.com/CE97awrd.htm, 2 pages.

(List continued on next page.)

*Primary Examiner*—Meng-Al T. An
*Assistant Examiner*—The Thanh Ho
(74) *Attorney, Agent, or Firm*—Testa, Hurwitz & Thibeault, LLP

(57) ABSTRACT

A software development toolkit allows a user to create one or more real-time interactive control and communication software objects for use in connection with a computer and a machine which communicate pursuant to a standard communication protocol for process control. The toolkit allows, for example, a user to create ActiveX controls that are OPC compliant.

17 Claims, 15 Drawing Sheets

OTHER PUBLICATIONS

What is OPC?, downloaded Mar. 12, 1998 from http://www.iconics.com/opc/what_opc.htm, 1 page.

OPC ToolWorX, downloaded Mar. 12, 1998 from http://www.iconics.com/opc/toolw2.htm, 3 pages.

National Instruments, OPC—Frequently Asked Questions, downloaded Mar. 12, 1998 from http://www.natinst.com/automation/opc_faq.htm, 2 pages.

OPC Programmers' Connection, History of OPC, downloaded Mar. 12, 1998 from http://www.dspace.dial.pipex.com/town/estate/on50/history.shtml, 2 page.

Microsoft Corporation, COM Technologies Home Page, downloaded Mar. 12, 1998 from http://www.microsoft.com/com/comintro.htm, 1 page.

Mark Edmond, Efforts Advance to Tie Shop–Floor Automation to Back–Office Systems,Start Magazine, vol. 2 No. 1, Jan./Feb. 1998, downloaded Feb. 24, 1999 from http://www.startmag.com/v2n1opc1.htm, 6 pages.

Edward Bassett, Making the OPC Connection, Start Magazine vol. 2 No. 4, Jul./Aug. 1998, downloaded Feb. 24, 1999 from http://www.startmag.com/v2n4opcp002.htm, 3 pages.

Mark Edmund, 51 Companies were Selected as The Hottest Companies in 1998 after moinths of deliberation by a panel of start's editors, Start Magazine vol. 2 No. 4, Jul./Aug. 1998, downloaded Feb. 24, 1999 from http://www.startmag.com/v2n4p030.htm#ICONICS, 23 pages.

International Search Report, PCT/US99/05534, 7 pages, Jul. 6, 1999.

"ActiveX Technology Optimizes Process Visualization," by P. Wiedenberg, Engineering and Automation, vol. 20, Jan. 1998, pp. 36–37.

"Windows NT and 95 OSS, OPC, Activex, and RAD Tools Shape Course of OL Software, " by B. Anger, I & CS Industrial and Process Control Magazine, vol. 69, Nov. 1996, pp. 49–54.

"How MFC Does Activex Connections," by Shepard et al., Dr. Dobbs Journal, vol. 22, Apr. 1997, pp. 109–113.

"Wird OLE for Process Control (OPC) Ein Neuer Industriestandard ?", by J. Schmoll, Automatisierungstechnische Praxis–ATP, vol. 39, May 1997, pp. 14–17.

ICONICS Data WorX32, OPC Redundancy & Bridging, http://www.iconics.com/Genesis32/DataworX_99.htm, printed Oct. 15, 1999.

National Instruments: "Graphical Programming for PC Automation" Instrupedia 97. Your Interactive Encyclopedia For Instrumentation, vol. 2, No. 1, 1997, pp. 6–21 to 6–28, XP–002132205.

Vertical Industry Specifications Supported in Windows DNA, http://www.microsoft.com/Dna/industry/vertical.asp, printed Oct. 18, 1999.

Welcome to Logo.gif (3167 bytes), OPC–To–The–Core http://www.iconics.com/index2.htm, printed Oct. 18, 1999.

Archana Shrotriya: "Using Object Linking And Embedding (Ole) Automation In Labview 4.0" National Instruments, Application Note 081, XP–002132206.

FIG. 12

MFC ActiveX ControlWizard - Step 1 of 2

How many controls would you like your project to have?

1

Would you like the controls in this project to have a runtime license?

○ Yes, please
⊙ No runtime license

Would you like source file comments to be generated?

⊙ Yes, please
○ No comments

Would you like help files to be generated?

○ Yes, please
⊙ No help files

< Back | Next > | Finish | Cancel 150
152
154

ICONICS ActiveX ToolWorX Wizard (Step 2)

Step 2: insert files "Gwx32.cpp" and "Gwx32.h" into the project. You will be prompted to insert new files into your project. Choose the files "Gwx32.cpp" and "Gwx32.h" (use the control key to select more than one file).
These files need to be inserted into the project to successfully build to project.

Continue...

FIG. 15

PROCESS CONTROL

CROSS-REFERENCE TO RELATED APPLICATIONS

This is based on and claims priority to and the benefit of U.S. Provisional Patent Application Ser. No. 60/077,843, filed Mar. 13, 1998, and U.S. Provisional Patent Application Ser. No. 60/079,355, filed Mar. 25, 1998. The entirety of both of these applications is hereby incorporated herein by reference.

TECHNICAL FIELD

The invention relates to the development, creation, and use of software for process control, specifically ActiveX controls that are OPC compliant.

BACKGROUND INFORMATION

Process control relates to the control of the parameters of a process, such as a manufacturing process. The parameters can include duration, temperature, pressure, speed, quantity, and/or direction of motion, for example. In other processes, such as in those performed in the course of using and maintaining information systems, management systems, and the like, the parameters may relate to paper documents or machine-readable media, or to intangible quantities such as units of time or units of money such as a credit limit, or enunciation of a result such as may be accomplished by a printer, a visual display module, or an aural signal. Process control systems can be used to help manage production, monitor and maintain equipment, and/or perform business functions such as maintaining inventory records, performing accounting, and tracking sales.

Manufacturers generally purchase equipment for performing each of the necessary manufacturing tasks, rather than building all of the necessary equipment. The equipment often is supplied by a number of different vendors. These diverse pieces of equipment often are not designed to communicate with each other. Also, certain machines may be numerically controllable, and may have the capability of being connected individually to a computer. Typically, however, different known machines do not utilize electrical control signals of the same format.

Connecting multiple machines of several different types, which may have been built by different vendors, into a single unified process control system can be a difficult task. Many equipment suppliers employ proprietary data communication systems or formats. Standardized data communication formats and protocols are sometimes agreed upon in an industrial setting, but years may pass before the majority of equipment manufacturers implement the standards in the machines they sell. There are competing and incompatible standardized data communication protocols that have been implemented by various companies or groups of rival companies.

SUMMARY OF THE INVENTION

A manufacturer of processing machinery generally wants to provide to customers not only a machine but also the capability of connecting the machine into a process control system that can improve the productivity of the machine. In order to make this interconnection process as simple and as convenient as possible for the purchaser of the machine, the manufacturer can supply software that allows the interconnection to be done simply by installing the software on a control computer and hooking up the appropriate wiring. A software development toolkit according to the invention eases the task of connecting a computer and a machine to allow them to communicate according to a standard communication protocol for process control. The toolkit allows a user to produce the necessary real-time interactive control and communication software objects, such as ActiveX controls, that are used in connecting and interoperating the control computer and the machines.

In one aspect, the invention features a method of creating one or more real-time interactive control and communication software objects for use in connection with a computer and a machine which communicate according to a standard communication protocol for process control. The method comprises producing a display module which displays a graphical representation of a user interface of the machine on a display of the computer, and associating the graphical representation of the user interface with at least one control signal. The method further comprises producing a control module to examine the graphical representation of the user interface and the associated control signal, and producing a communication module to communicate the associated control signal using the standard communication protocol for process control. The method also comprises producing a framework module to interconnect functionally the display module, the control module, and the communication module. The framework module, the display module, the control module, and the communication module are merged to create the one or more real-time interactive control and communication software objects.

Embodiments of this aspect of the invention can have the following features. For example, the standard communication protocol can be the Object Linking and Embedding ("OLE") for Process Control (OPC) protocol. The real-time interactive control and communication software objects can be objects insertable using standard object insertion techniques, such as ActiveX control objects. The control module can examine the graphical representation of the user interface and the associated control signal periodically, or it can examine the graphical representation of the user interface and the associated control signal when a change in the graphical representation of the user interface or a change in the associated control signal is detected. Pre-fabricated software modules can be used in the method, including such modules as a pre-fabricated software image of a graphical representation. The software which is generated by the method can be compiled software or interpreted software.

In another aspect, the invention involves a computer-readable medium on which is stored a computer program for creating one or more real-time interactive control and communication software objects for use in connection with a computer and a machine which communicate according to a standard communication protocol for process control. The computer program comprises instructions, which, when executed by a computer, perform the steps of producing a display module which displays a graphical representation of a user interface of the machine on a display of the computer, associating the graphical representation of a user interface with at least one control signal, and producing a control module to examine the graphical representation of the user interface and the associated control signal. The computer program further comprises instructions, which, when executed by a computer, perform the steps of producing a communication module to communicate the associated control signal using the standard communication protocol for process control and producing a framework module to interconnect functionally the display module, the control module, and the communication module, and merging the framework module, the display module, the control module, and the communication module to create the one or more real-time interactive control and communication software objects.

Embodiments of this othe aspect of the invention can have the following features. For example, the communication module can communicate using the Object linking and embedding for Process Control (OPC) protocol. The real-time interactive control and communication software objects can be objects insertable using standard object insertion techniques, such as ActiveX control objects. The control module can examine the graphical representation of the user interface and the associated control signal periodically, or when a change in the graphical representation of the user interface or in the associated control signal is detected. The program can utilize a pre-fabricated software image of the graphical representation. The merge module may compile and link the framework module with the display module, the control module, and the communication module or it may interpret them in order to create the one or more real-time interactive control and communication software objects.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being based upon illustrating the principles of the invention.

FIG. 12 is a screen displayed during the production of a software object according to the invention.

FIG. 15 is a screen displayed during the production of a software object according to the invention.

DESCRIPTION

This invention relates generally to a toolkit that at least partially automates the production of ActiveX controls which are used in process control applications using the Object Linking and Embedding ("OLE") for Process Control ("OPC") communication protocol. The toolkit is called ActiveX ToolWorX, and is a product of ICONICS Inc. Generally, in order to create a real-time interactive control and communication software object that is compliant with a standard communication protocol for process control pursuant to the invention, such as an ActiveX control that is OPC compliant, certain information must be provided for incorporation into the process control software. This information must describe the details of the hardware and operating system of the computer that will be used in the process control system, the details of the signals provided by the machine(s) which will be controlled, the details of the signals that the computer must provide to the machine(s), and the details of the communication protocol that will be used. The information must describe how the physical controls of the machine are to be displayed on the computer. The description of the physical controls of the machine can be provided, for example, graphically in the form of an image or programmatically in the form of instructions. In creating the real-time interactive control and communication software object, the computer must create and present to the user a graphical display of the machine controls. The computer must create an association between the control features of the display, such as buttons, knobs and dials, and the signals which flow between the computer and the machine. The computer must create and make available a software control module which allows the computer to examine the status of the display of the machine controls and the status of the control signals. The computer must create and make available a software module which provides the ability to communicate control signals between the computer and the machine. In carrying out the software preparation, the computer must create a module which organizes and interconnects all of the features described above into a coherent whole, by creating a framework upon which to interrelate all of the software modules. Finally, the computer must combine or merge all of the modules into one or more functional software objects, which perform the process control function when operating in the computer.

Figure 1:
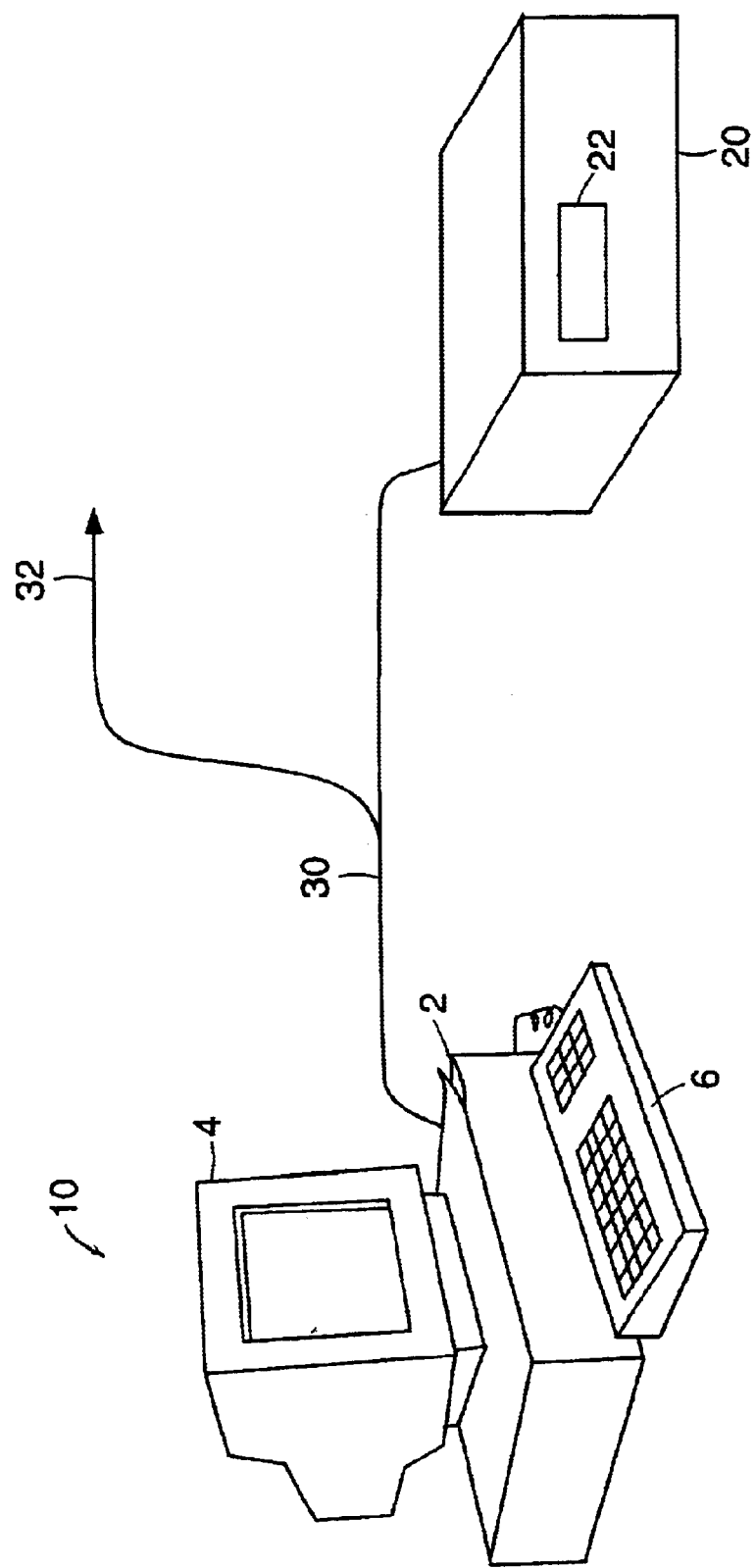
FIG. 1 is a schematic overview of an example of a process control system showing the interrelationships between and among the components of the system.

Referring to FIG. 1, a computer 10 is connected via a communication bus 30 to a machine 20 which performs one or more steps in a process. The computer 10 can be a general purpose personal computer (PC) or other type of processing device. The computer 10 typically comprises a central processing unit and communication terminal 2, a display terminal 4, and an input device such as a keyboard 6. The display terminal 4 can be a touch screen display, in which case it can function as both a display device and an input device. Different and/or additional input devices can be present such as a mouse or a joystick, and different or additional output devices can be present such as a second display or a printer. The computer 10 can run any one of a variety of operating systems including Windows or MacOS. The communication bus 30 may have one or more branches, such as branch 32, connecting other machines, which may be a second machine of the type of the machine 20 or a different type of machine. The computer 10, operating under the control of process control software such as that which may be created by the method of the present invention, communicates with the machine 20 via the communication bus 30 using a standard communication protocol for process control, such as the Object Linking and Embedding ("OLE") for Process Control ("OPC") protocol. The OPC protocol has been defined by the OPC Foundation, and it is based on Object Linking and Embedding ("OLE") technology. Other standardized communication protocols for process control could be used as the communication protocol in other embodiments of the invention. The machine 10 may have a user interface 22 which can comprise a graphical or an alphanumeric display which may include gauges and the like and may comprise controls such as buttons, knobs, sliders, gauges and the like. For purposes of controlling the process steps performed by the machine 10, the user interface 22 of the machine 10 may be represented by a display of some or all of the user interface on the display terminal 4 of the computer 10. Just as some or all of the controls comprising the user interface 22 of the machine 10 may be available for the machine operator to inspect or adjust, so may the corresponding controls comprising the display of the user interface upon the display terminal 4 be available for inspection and adjustment. In general, some or all of the controls may be available for adjustment by an operator at the computer 10 and not available for adjustment at the machine 20, or vice versa.

Figure 2:
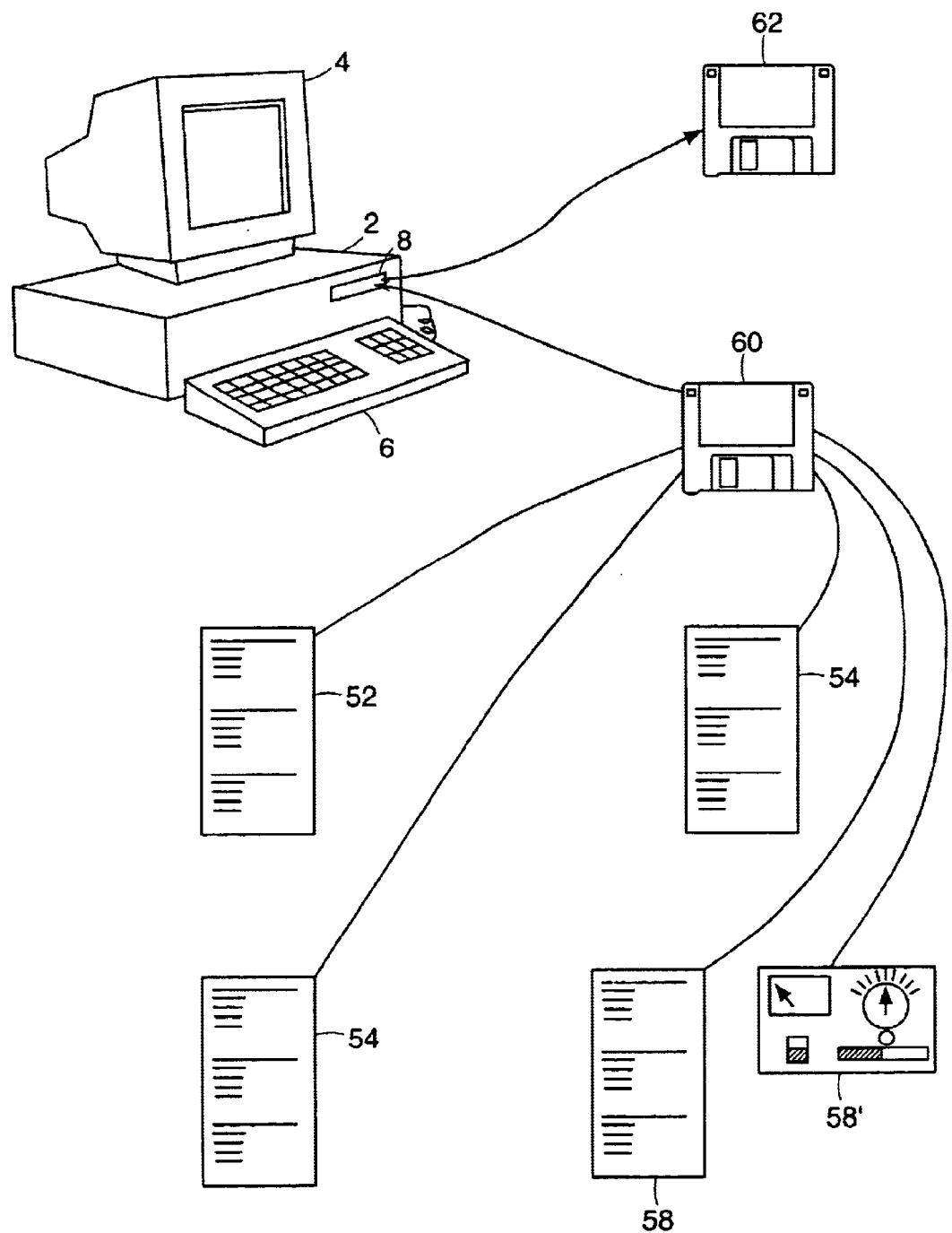
FIG. 2 depicts a method of the invention, and depicts the creation of an article of manufacture according to the invention.

FIG. 2 also depicts the computer 10, which further comprises a drive 8 which may be used to read and to write machine-readable media. The drive 8 can be a floppy disk drive, a magnetic tape drive, a CD-ROM drive, or another type of drive such as a hard drive. Various computer files, code segments, software objects and data may be provided to the computer upon machine-readable media which the computer accesses via the drive 8. The computer 10 can be one of a plurality of computers in a network, and may obtain copies of computer files, code segments, software objects and data from one or more computers in the network. Alternatively, computer files, code segments, software objects and data can be provided by an operator using an input device such as the keyboard 6. Also, portions of the necessary computer files, code segments, software objects and data may be provided by some combination of machine-readable media, by one or more computers operating in a network with the computer 10, and by operator input via an input device.

The computer files, code segments, software objects and data which are furnished to the computer 10 may be broadly divided into four categories. Information and parameters relating to the internal workings of the computer 10 are represented as computer files, code segments, software objects and data in the list 52. Information and parameters relating to the internal workings of the machine 20 are represented as computer files, code segments, software objects and data in the list 54. Information and parameters relating to the standard communication protocol for process control are represented as computer files, code segments, software objects and data in the list 56. One or more images of the user interface of the machine 20 are represented as computer files, code segments, software objects and data in the list 58, or in the form of an image object 58'. The computer information and parameter list 52, the machine information and parameter list 54, the standard communication protocol for process control information and parameter list 56, and the image list 58 and/or image object 58' can be embedded on one or more floppy disks 60 and provided to the computer 10. Software can be provided to the computer 10 as machine-readable computer files, code segments, software objects and data embedded on one or more floppy disks 60. The software objects which are created by the computer can be embedded on one or more floppy disks 62. Also, the computer files, code segments, software objects and data can be made available on other machine-readable media, such as tapes, CD-ROMs, or high capacity disks such as Zip™ disks and the like.

Figure 3:
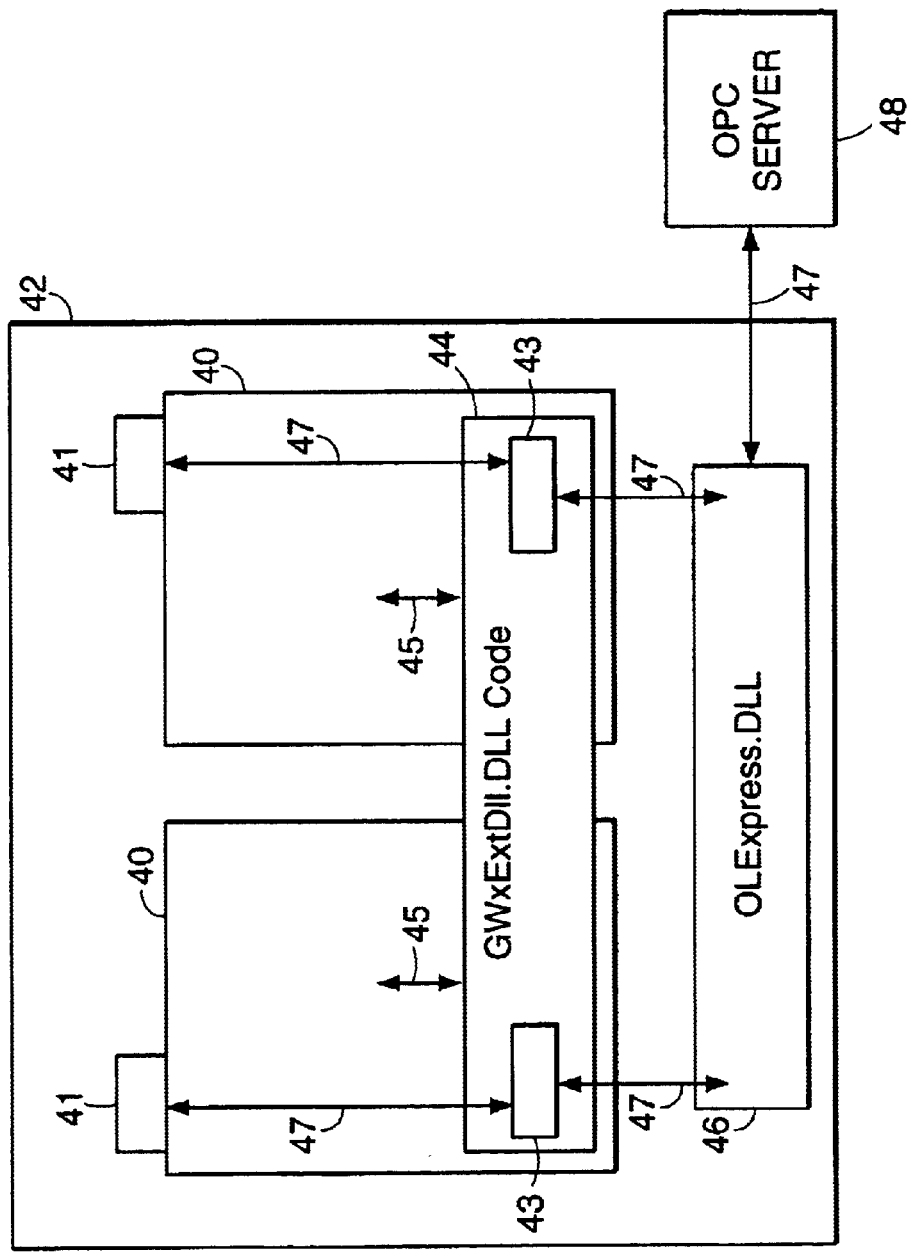
FIG. 3 depicts a schematic of the internal organization of the client side of the process control software which may be produced pursuant to the invention.

FIG. 3 depicts a schematic of the internal organization of the client-side of process control software objects which may be created pursuant to the invention. One or more real-time interactive control and communication software objects 40 are inserted into an application software object called a container 42. The container 42 is software which is designed to operate with objects which have interactive capabilities. In one embodiment, the real-time interactive control and communication software objects 40 are ActiveX control objects, and the container 42 is Microsoft Visual Basic. In other embodiments the container 42 may be Microsoft Internet Explorer which runs an HTML page, or ICONICS GraphWorX32, or Netscape Communicator which run an HTML page. Internet Explorer is a web browser manufactured by Microsoft Corporation, Netscape Communicator is a web browser manufactured by the Netscape Corporation, and GraphWorX32 is a software product of ICONICS Inc. used for Human/Machine Interfaces ("HMI"). A real-time interactive control and communication software object 40 may give rise to one or more exemplars of the Active X control, which are called instances 41. As is familiar to those of ordinary skill in the art, these instances 41 are embedded into the container 42. Embedding as used herein denotes particularly making the real-time interactive control and communication software object 40 functional as a control through the intermediation of the container application 42, and includes the possible utilization of one or more additional software files.

In one embodiment of the present invention, two dynamic link libraries are employed to complete the interconnection of the control object 40 to an OPC server 48. These dynamic link library files are named GwxExtDll.DLL 44 and OLExpress.DLL 46. The GwxExtDll.DLL 44 provides extensions of Microsoft Foundation Classes ("MFC"). The MFC are class definitions well known to those of ordinary skill in the software arts. In operation, a copy of the GwxExtDll.DLL 44 code is loaded into the memory of the computer 10. The OLExpress.DLL 46 provides an interconnection for OPC data or signals 47 (hereinafter generally "OPC signals 47") to be communicated between an OPC server 48 and the copy of the GwxExtDll.DLL 44 code in the memory of computer 10. The OLExpress.DLL 46 links only to the GwxExtDll.DLL 44 code and not to the instance 41 of the real-time interactive control and communication software object 40. The OPC signals 47 thus pass from the OPC server 48 to the OLExpress.DLL 46 code in the memory of the computer 10, and then to the copy of the GwxExtDll.DLL 44 in memory where the information is stored in memory locations 43 associated with the specific instance 41 with which the OPC data or signals 47 are associated. The OPC signals 47 are then communicated from the respective memory locations 43 of the copy of the GwxExtDll.DLL 44 to the instances 41. The OPC signals 47 can be bidirectional. The real-time interactive control and communication software object 40 is made active through messages 45 which pass bidirectionally between the copy of the GwxExt- Dll.DLL 44 in memory and the real-time interactive control and communication software object 40.

In one embodiment, the OPC server 48 is a virtual machine operating within the computer 10. In an alternative embodiment, the OPC server 48 operates on another computer networked with the computer 10, and communicates the OPC signals 47 via the network to the OLExpress.DLL 46 code resident in the memory of the computer 10. In either circumstance, the machine 20 which is operating within the process control system comprises an interface incorporated therein by the manufacturer or by an aftermarket upgrader which provides the capability of accepting internal signals of the machine 20 and communicating the OPC signals 47 to the OPC server 48, and the capability of accepting the OPC signals 47 from the OPC server 48 and converting them into internal signals for use within the machine 20. The list 54 referred to above with regard to FIG. 2 thus represents a list of the correspondences between the OPC signals 47 which the machine 20 provides and/or receives and the states of the controls and displays of user interface 22 of the machine 20. The computer 10 may employ the list 54 to associate at least one particular OPC signal 47 with the graphical representation of the user interface of the machine 20 which appears on the display of the computer 10.

Figure 4:
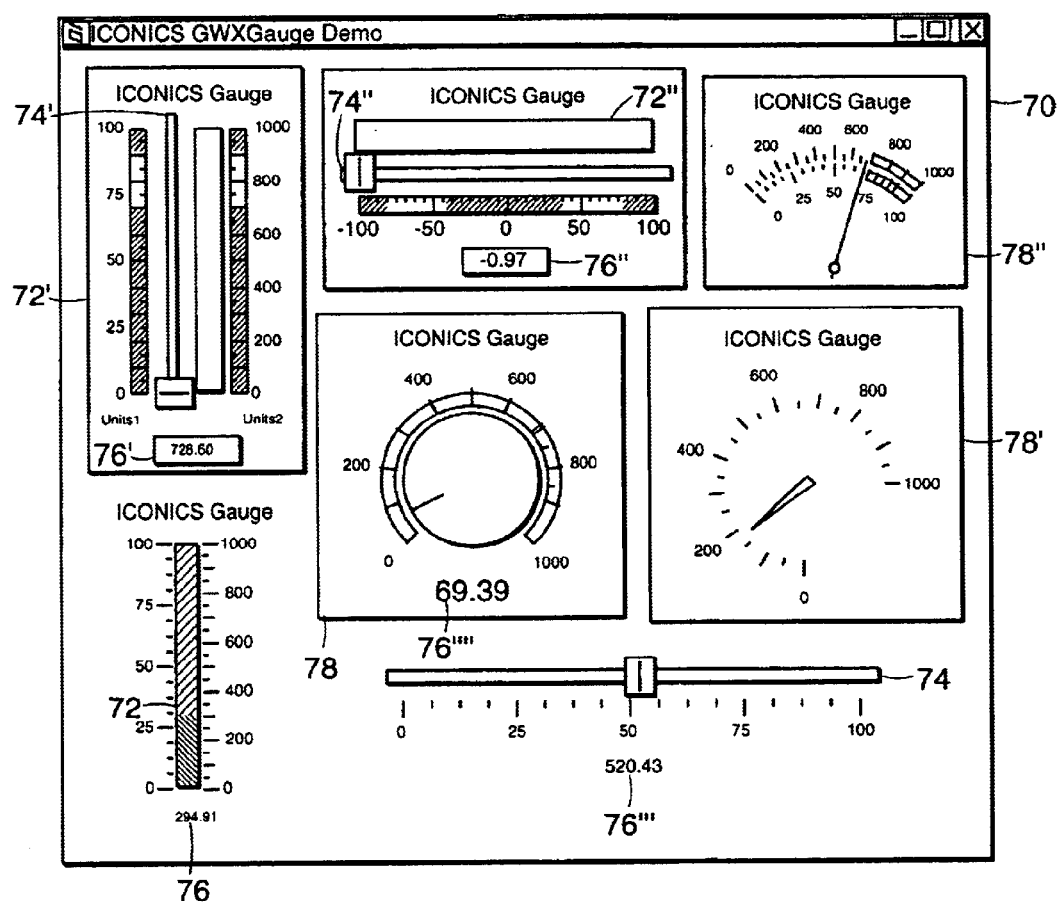
FIG. 4 depicts a computer screen display associated with a pre-fabricated software object for presenting graphically a plurality of controls according to the invention.

FIG. 4 depicts the computer screen display provided by a pre-fabricated software object. This software object may be used to present a graphical display of a plurality of controls according to the present invention. In this embodiment, a variety of display formats are depicted. The computer 10 is programmed to compute a value which varies from 0 to 1000 according to some rule of computation, such as a sawtooth function which varies linearly from zero to 1000 in a time period of 10 seconds, holds the value of 1000 for one second and then repeats. A real-time interactive control and communication software object 40 provides a display 70 which comprises a plurality of gauges which may be connected to the computed value individually or simultaneously. The linear gauges 72, 72' and 72" depict respectively a single vertical linear gauge with two scales (which depicts percent of range on the left of the gauge 72 and absolute value on the right of the gauge 72), dual vertical linear gauges 72' (which depict percent of range on the left gauge of the gauge 72' and absolute value on the right gauge of the gauge 72'), and a horizontal differential gauge 72". A slider 74 is depicted at the bottom of the display 70. Additional sliders are presented in conjunction with the gauge 72' (a slider 74') and the gauge 72" (a slider 74"). Three circular gauges 78, 78' and 78" are also depicted, the gauge 78 in the form of a knob which may be rotated, the gauge 78' in the form of a gauge reminiscent of an analog speedometer, and the gauge 78" in a form reminiscent of analog electrical meters. Finally, five digital gauges 76, 76', 76", 76''', and 76'''' are associated with the gauges 72, 72', 72", 74, and 78, respectively. As may be apparent, the form of a gauge or data enunciator in the present invention may be varied without departing from the spirit of the invention. For example, as is well known to those familiar with the software arts, the digital gauges 76, 76', 76", 76''' and 76'''' could as easily be designed to present alphanumeric information representative of an OPC signal 47.

Figure 5:
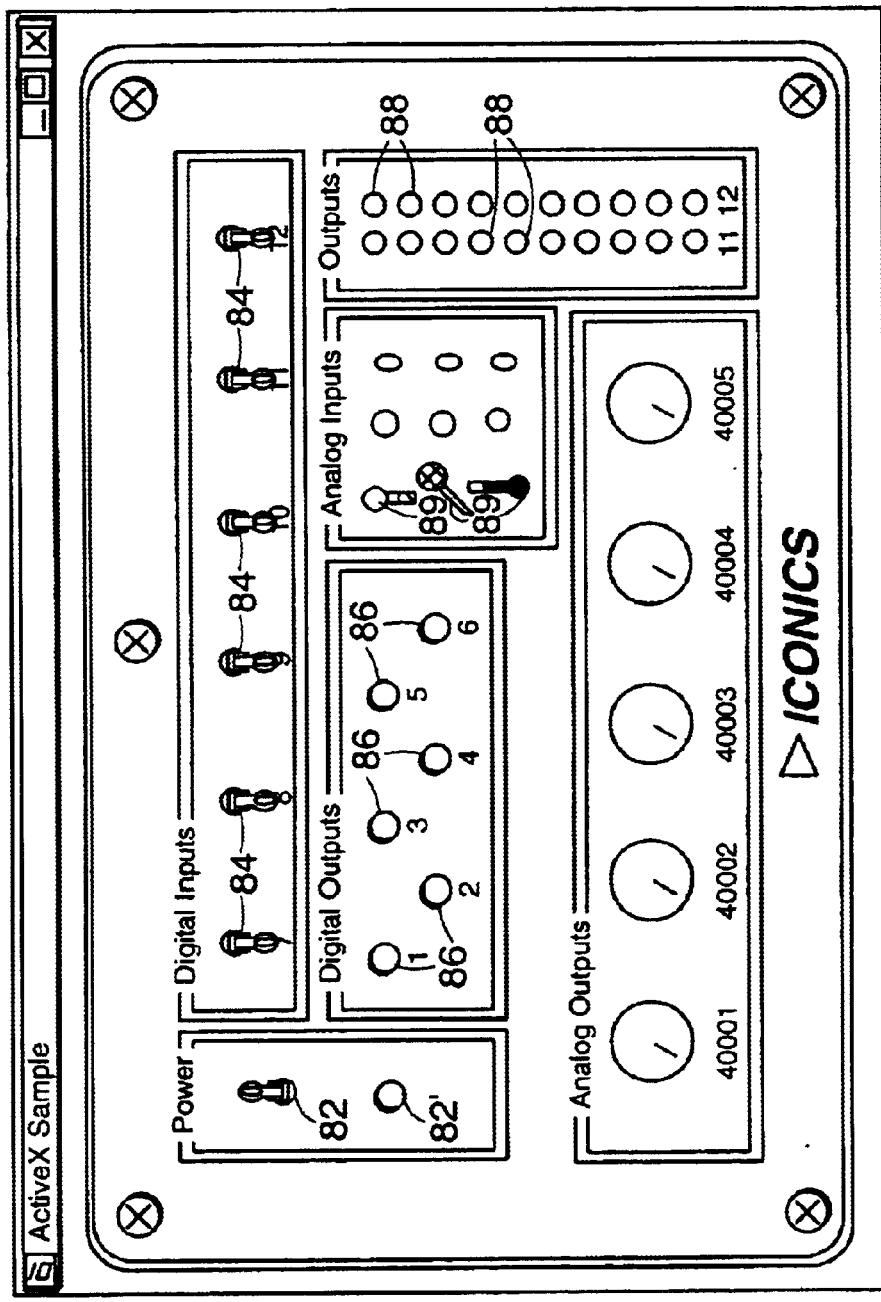
FIG. 5 depicts another computer screen display associated with a pre-fabricated software object for presenting controls graphically.

FIG. 5 depicts another pre-fabricated software object used for presenting a graphical display of a plurality of controls according to the invention. This embodiment depicts a graphical display 80, which is characteristic of a graphical user interface as displayed on a computer display. This graphical display 80 is representative of a hardware device which may be situated at the location of a machine, and has a one-to-one correspondence between each of its depicted features (e.g., knobs, buttons, dials, etc.), and the real hardware device, even down to the Philips-head screws on the face of the machine. The graphical display 80 may depict the condition of each of the features of the actual hardware device, or may represent the condition of some feature that the user at the computer wishes to signal to the machine, or some combination of such conditions. Within the graphical display 80 are depicted a number of features. These include a power control 82, which is depicted as a toggle switch, having associated therewith an enunciator 82', which is depicted as a lamp. When the computer and the machine are in communication as contemplated in the present invention, and the switch 82 is turned on, either by the computer user via the keyboard or another input device, or by a user situated at the actual machine, the lamp 82' will turn on to enunciate that power is being applied to the machine. The graphical display 80 further depicts 5 analog inputs 40001, 40002, 40003, 40004, and 40005, which are depicted as rotatable knobs, and which on the actual hardware device are knobs which can be rotated to turn rheostats to increase or decrease corresponding analog signals. In operation, the user at the computer could adjust the position of a knob, say 40001, by indicating that the user desired to raise or lower the value of the signal, for example by clicking on the knob 40001, and dragging the mouse to the left (counterclockwise) to lower the value of the signal, or dragging the mouse to the right (clockwise) to raise the value of the signal. Alternatively, the user could highlight the knob 40001 by moving the mouse pointer over the knob 40001 and use the right and left arrow keys to adjust the value. The knob would then rotate in the graphical display 80, in a manner analogous to the manual turning of the corresponding knob on the actual hardware device, and a signal representing the position of the knob would be transmitted to the actual hardware device, which could then act on the signal as if the real knob had been turned. In a similar manner, the graphical display 80 depicts 6 digital inputs, generally 84, which are toggle switches that can take either of two positions, one of which would denote digital zero and the other digital one (or equivalently Boolean values TRUE and FALSE). In similar fashion, the graphical display 80 depicts 6 digital outputs which can also take either of two values, such as on or off, or equivalently lighted or dark (or equivalently Boolean values TRUE and FALSE). The inputs could be representative of inputs of data by the user at the computer and the outputs could be representative of the corresponding result at the actual hardware device. Conversely, the inputs could be representative of inputs of data by the user at the actual hardware device and the outputs could be representative of the corresponding result at the computer display. One could also define some number of the inputs to be active at the actual hardware device, and the remainder active at the computer display, with the corresponding outputs following the status of the appropriate input. Further depicted on the graphical display 80 are 20 output lamps generally 88, which are arranged in two rows, or banks, of 10 indicators each. These outputs could represent the digital or logical (Boolean) states of 20 distinct digital devices. These outputs could alternatively represent an output which varies from zero to 99, as follows. Each lamp in a row might be associated with a digit, beginning with zero at one end and ending with 9 at the other, and each bank might be associated with a power of ten, so that illuminating the lamp corresponding to 2 in the rightmost row and the lamp corresponding to 4 in the leftmost row would indicate "42" or "4.2" or 42×10=420, depending on the power of ten ascribed to each row. Alternatively, they could have some other significance, depending on how they are defined. The graphical display 80 of the present embodiment has three additional analog inputs, generally 89. Each of the inputs and outputs enumerated can be active either as an input device used by the operator at the computer, or as an indicator to the user at the computer of the state of the corresponding input at the actual hardware device.

Figure 6:
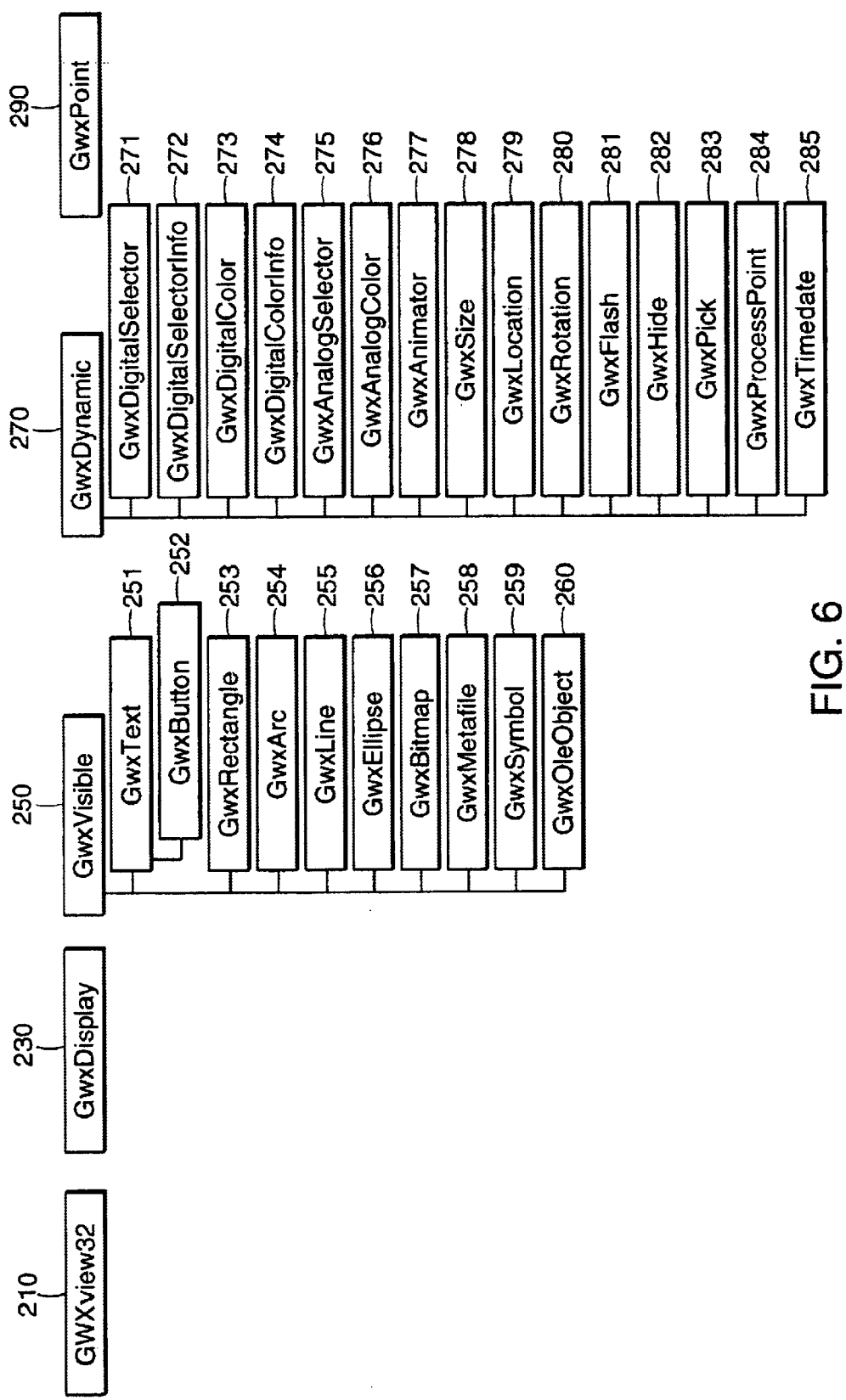
FIG. 6 depicts a number of software objects which may be used in the production of a software object according to the invention.

FIG. 6 depicts an embodiment of each of a number of software objects which may be used in the creation of a software object according to the present invention. These software objects are pre-fabricated objects which provide various functional capabilities to the software developer in planning and in carrying out the creation of one or more real-time interactive control and communication software objects for use in connection with a computer and a machine which communicate according to a standard communication protocol for process control. A description of the attributes, including the methods and the properties of each of these various pre-fabricated software objects which may be used by a software developer of ordinary skill in the art, is presented. In the following description, the term "method" and the term "property" (or their plurals) are terms of art used by those of ordinary skill in discussing the features of software objects. These terms are commonly used by software developers who use Microsoft Visual Basic and ActiveX controls. The description begins with an overview of the features and attributes of the highest level of the hierarchy of these objects, namely the object types of the objects GWXview32 210, GwxDisplay 230, GwxVisible 250, GwxDynamic 270 and GwxPoint 290.

GWXview32 210 is the object type for the embodiment of the real-time interactive control and communication software object called a GraphWorX32 ActiveX control (GWXview32.ocx). When using ActiveX ToolWorX, the properties and methods described in this section can be inherited by new ActiveX controls. Each GWXview32 210 object contains a single GwxDisplay 230 object.

The properties of GWXview32-derived objects in this embodiment include: short BorderStyle, a parameter which defines the border style of the window, for which valid values are no border or normal border; short Appearance, a parameter which defines the appearance of the window border, for which the valid values are flat or 3-D; BSTR DisplayName, a parameter which contains the File name of the GraphWorX32 display loaded in this object/control, whereby setting this property to a new file name will cause the new display to be loaded; boolean UseAmbientBackColor, a parameter which takes the values TRUE and FALSE, and when TRUE, the background color of the object/control will automatically be set to match the background color of the container in which this object is embedded, but only if the container supports the AmbientBackColor property; boolean AutoStartRuntime, a parameter which takes the values TRUE and FALSE, and when TRUE, the object/control will automatically enter runtime mode when the object's container enters runtime mode, but only if the container supports the AmbientUserMode property; boolean OverrideScrollbarSettings, a parameter which takes the values TRUE and FALSE, and when TRUE, this property indicates the object/control will override the scrollbar visibility settings of the display currently loaded in the control, but when FALSE, the object/control will use the scrollbar settings defined in the currently loaded display; boolean VerticalScrollbar, a parameter which takes the values TRUE and FALSE, and when TRUE, the vertical scrollbar of the control's window is visible, when FALSE the vertical scrollbar is hidden; however, this property is ignored if OverrideScrollbarSettings is FALSE; and boolean HorizontalScrollbar, a parameter which takes the values TRUE and FALSE, and when TRUE, the horizontal scrollbar of the control's window is visible, when FALSE the horizontal scrollbar is hidden; however, this property is ignored if OverrideScrollbarSettings is FALSE.

The methods associated with GWXview32-derived objects in this embodiment include void StartRuntime( ), which puts the object/control into runtime mode; void StopRuntime( ), which takes the object/control out of runtime mode; and IDispatch* GetDisplay( ), which returns the GwxDisplay 230 object for the display currently loaded in the object/control, which in turn can then be used to access all of the properties and methods of all the object types described.

GwxDisplay 230 is the object type for GraphWorX32 displays. A GraphWorX32 display contains collections of GwxVisible-derived objects, GwxDynamic-derived objects, and GwxPoint 290 objects. The GwxDisplay 230 object exposes methods for creating and getting existing instances of these visible and dynamic objects.

The properties and methods of GwxDisplay-derived objects are described in detail below, as are the exposed events. The properties include: OLE_COLOR BackgroundColor, a parameter which this gets or sets the current display's background color; boolean Redraw, a parameter which takes the values true and false, and when TRUE, automation calls automatically refresh the display, but when FALSE, the user must explicitly refresh the display, which for example permits the user to change the attributes of many objects, and refresh them all at once; and short ScaleMode, a parameter which sets the scaling mode of the current display, for which valid values are FixedScale, Scaleable and ScaleablePreserveAspect.

The methods associated with GwxDisplay-derived objects in this embodiment are numerous. Some of the methods are available in all situations, and some are available only in configure mode.

The methods which are generally available include: BSTR GetFileName( ), which returns the name of the currently loaded display; boolean FileOpen(BSTR filename), which loads the specified resource display file, but not disk file displays, and returns the boolean value TRUE for success, and FALSE for failure; void ShowWindow( ), which shows the GraphWorX32 main window; void HideWindow( ), which hides the GraphWorX32 main window; void RefreshWindow( ), which redraws the visible portion of a GraphWorX32 display; void GetWindowDimensionsPixels(long* left, long* top, long* width, long* height), which gets the GraphWorX32 main window size and location in pixels; void GetWindowDimensionsPercent(float* left, float* top, float* width, float* height), which gets the GraphWorX32 main window size and location as a percentage of the total screen size and returns parameters with values in the range of 0.0 to 1.0; void GetDisplayDimensions(long* width, long* height), which retrieves the display dimensions (work area/world bounds) of the currently loaded display; void SetDisplayDimensions(long width, long height), which sets the display dimensions (work area/world bounds) of the currently loaded display; void SetViewDimensions(long left, long top, long width, long height), which sets the GraphWorX32 view rectangle's size and location, and defines what portion of the work area/whole display is visible, which in turn may be used to zoom and pan the view of a display; void GetViewDimensions(long* left, long* top, long* width, long* height), which gets the GraphWorX32 view rectangle's size and location; void GetClientDimensionsPixels(long* left, long* top, long* width, long* height), which gets the GraphWorX32 client rectangle's size and location in pixels, representing the area of the main window not including the borders, title bar, and menu bar; boolean IsRuntimeMode( ), which returns TRUE if GraphWorX32 is currently in runtime mode, and FALSE otherwise; void StartRuntime( ), which puts GraphWorX32 into runtime mode; void StopRuntime( ), which takes GraphWorX32 out of runtime mode and puts it into configure mode; boolean ToggleRuntime( ), which toggles the current operator mode between configure mode and runtime mode, and returns TRUE, if the method put GraphWorX32 into runtime mode, and FALSE if the method put GraphWorX32 into configure mode; IDispatch* GetVisibleObjectFromName(BSTR objectName), which gets the visible object with the specified object name, which returned object type will be GwxVisible 250 or one of GwxVisible-derived object types (GwxText 251, GwxButton 252, GwxRectangle 253, GwxArc 254, GwxLine 255, GwxEllipse 256, GwxBitmap 257, GwxMetafile 258, GwxSymbol 259, GwxOleObject 260), but returns NULL if no matching object is found; long GetNumberOfTopLevelVisibles( ), which returns the number of visible objects in the root symbol of a display, which are referred to as "Top Level Visibles" because they are the objects in top-most level of the symbol hierarchy; IDispatch* GetVisibleObjectFromIndex(long index), which returns the Top Level Visible with the given zero-based index, which is the object furthest back in the z-order, making this function useful for iterating through all the top level visible objects; IDispatch* GetDynamicObjectFromName(BSTR objectName), which gets the dynamic object with the specified object name, which returned object will be of type GwxDynamic 270 or one of the GwxDynamic derived types (GwxDigitalSelector 271, GwxDigitalSelectorInfo 272, GwxDigitalColor 273, GwxDigitalColorInfo 274, GwxAnalogSelector 275, GwxAnalogColor 276, GwxAnimator 277, GwxSize 278, GwxLocation 279, GwxRotation 280, GwxFlash 281, GwxHide 282, GwxPick 283, GwxProcessPoint 284, GwxTimeDate 285), and which returns NULL if no matching object is found; IDispatch* GetPointObjectFromName(BSTR pointName), which gets the data point object with the specified point name, which returned object will be of type GwxPoint 290, and which returns NULL if no matching object is found; IDispatch* GetHeadObject( ), a method that gets the head visible object but if there is no head object, the method returns NULL; boolean SetHeadObject(BSTR objectName), a method that sets the head object to the visible object with the specified name, and returns TRUE for success, and FALSE for failure; boolean SetAliasDefinition (BSTR aliasName, BSTR newDefinition), a method that sets the alias definition of the specified alias name for all dynamic objects in the display, and which may be used in runtime mode to easily change the data connections of dynamic objects on-the-fly, which returns FALSE if no matching alias names were found, and TRUE otherwise (See also GwxVisible::SetAliasDefinition and GwxDynamic::SetAliasDefinition); boolean OpenTagBrowser(long hWndParent, BSTR* tagname), which opens the Tag Browser with the specified window handle as the parent window, and assigns the parameter tagName according to the tag name selected by the user, and returns TRUE if the user has hit the OK button, and FALSE if the user has hit the Cancel button; boolean QueryRanges (BSTR dataSource, double* lowRange, double* highRange), which queries the OPC server for the high and low range values of the specified tag name (dataSource); boolean SetRuntimeUpdateRate(long updateRate), which sets the OPC data update rate for the display; boolean SetTooltipProperties(boolean ShowDynamicTips, boolean ShowDynamicObjectName, boolean ShowDynamicObjectDescription, boolean ShowDataSourceName, boolean ShowDataSourceValue, boolean ShowStaticTooltips, boolean ShowStaticObjectName, boolean ShowStaticObjectDescription), which sets the tooltip properties for the display; and boolean SetRuntimeFocusProperties(boolean ShowHandCursor, boolean ShowFocusRectangle, OLE_COLOR FillColor, OLE_COLOR BorderColor), which sets the attributes for runtime focus highlights; and boolean QueryDataType (BSTR dataSource, GWXDATATYPE* dataType), which queries the OPC server for the data type of the specified tag name (dataSource). Valid values for GWXDATATYPE are DataTypeShort, DataTypeLong, DataTypeFloat, DataTypeDouble, DataTypeString, DataTypeBool, and DataTypeByte.

The methods which operate only in configure mode include:

boolean PopCurrentSymbol( ), which pops the current symbol edit level up one level, and returns TRUE for success, or FALSE for failure (See also GwxSymbol::PushCurrentSymbol( )); boolean PopAllCurrentSymbol( ), which pops the current symbol edit level all the way back to the root level, and returns TRUE for success, or FALSE for failure (See also GwxSymbol::PushCurrentSymbol( )); boolean DeleteObject(BSTR objectName), which deletes the visible object with the specified object name, and returns TRUE for success, and FALSE for failure; boolean DeleteDynamic (BSTR objectName), which deletes the dynamic object with the specified object name, and returns TRUE for success, and FALSE for failure; void DeselectAllObjects( ), which deselects all currently selected visible objects; IDispatch* CreateEllipse(float left, float top, float width, float height, boolean isFilled, OLE_COLOR fillColor, OLE_COLOR lineColor, long lineWidth, GWXLINESTYLE lineStyle, boolean hasShadow, OLE_COLOR shadowColor, GWX3DEDGESTYLE edgeStyle, boolean isHidden, BSTR objectName), which creates and returns GwxEllipse 256 object with the specified attributes, in the current display (See also GwxEllipse 256 and GwxVisible 250); IDispatch* CreateRectangle(float left, float top, float width, float height, boolean isFilled, OLE_COLOR fillColor, OLE_COLOR lineColor, long lineWidth, GWXLINESTYLE lineStyle, boolean hasShadow, OLE_COLOR shadowColor, GWX3DEDGESTYLE edgeStyle, boolean isHidden, BSTR objectName, boolean rounded), which creates and returns a GwxRectangle 253 object with the specified attributes, in the current display (See also GwxRectangle 253 and GwxVisible 250); IDispatch* CreateText(float x, float y, BSTR text, long alignment, boolean stretchText, boolean isFilled, OLE_COLOR fillColor, OLE_COLOR lineColor, long lineWidth, GWXLINESTYLE lineStyle, boolean hasShadow, OLE_COLOR shadowColor, GWX3DEDGESTYLE edgeStyle, boolean isHidden, BSTR objectName), which creates and returns a GwxText 251 object with the specified attributes, in the current display, but which is available only in configure mode (See also GwxText 251 and GwxVisible 250); IDispatch* CreatePolyline (VARIANT vertices, boolean isFilled, OLE_COLOR fillColor, OLE_COLOR lineColor, long lineWidth, GWXLINESTYLE lineStyle, boolean hasShadow, OLE_COLOR shadowColor, GWX3DEDGESTYLE edgeStyle, boolean isHidden, BSTR objectName), which creates and returns a GwxLine 255 object with the specified attributes, in the current display, where the parameter vertices is an array of float values such that the elements 0, 2, 4, 6 . . . of the array are x-coordinates of the vertices of the line, and elements 1, 3, 5, 7 . . . of the array are y-coordinates of the vertices of the line, and when calling this method from a C++ application, the vertices parameter should be a "safe array" with the lower bound set to 1 (See also GwxLine 255 and GwxVisible 250); IDispatch* CreateArc (GWXARCTYPE arcType, float centerX, float centerY, float radiusX, float radiusY, float startAngle, float endAngle, boolean isFilled, OLE_COLOR fillColor, OLE_COLOR lineColor, long lineWidth, GWXLINESTYLE lineStyle, boolean hasShadow, OLE_COLOR shadowColor, GWX3DEDGESTYLE edgeStyle, boolean isHidden, BSTR objectName), which creates and returns a GwxArc 254 object with the specified attributes, in the current display, with angles which are specified in degrees (See also GwxArc 254 and GwxVisible 250); IDispatch* CreateSymbol (BSTR objectName), which groups all currently selected objects into a GwxSymbol 259 object, giving the resulting symbol object the specified object name, and returns the resulting GwxSymbol 259 object (See also GwxSymbol 259 and GwxVisible 250); boolean UngroupSymbol(BSTR objectName), which ungroups the GwxSymbol 259 object with the specified object name, and destroys the specified GwxSymbol 259, but does not destroy the objects that were grouped in that symbol, and which returns TRUE for success, and FALSE for failure; IDispatch* CreateSizeDynamic(BSTR visibleObjectName, BSTR dynamicObjectName, GWXSIZEDYNTYPE sizeType, boolean clip, float startSize, float endSize), which creates a GwxSize 278 object with the specified attributes and attaches it to the visible object with the specified object name, where the parameters startSize and endSize are percentage values in the range of 0.0 to 1.0, and valid values for GWXSIZEDYNTYPE are: SizeLeft, SizeRight, SizeUp, SizeDown, SizeUpLeft, SizeUpRight, SizeDownLeft, SizeDownRight, SizeLeftRight, SizeUpDown, SizeLeftRightBias, SizeUpDownBias, SizeAllFour, SizeLeftRightUp, SizeLeftRightDown, SizeUpDownLeft, and SizeUpDownRight, and the method returns the newly created GwxSize 278 object on success, and NULL if the operation fails (See also GwxSize 278 and GwxDynamic 270); IDispatch* CreateLocationDynamic(BSTR visibleObjectName, BSTR dynamicObjectName, float offsetX, float offsetY, boolean slider, boolean tracking, short numberOfDetents, boolean continuousUpdate), which creates a GwxLocation 279 object with the specified attributes and attaches it to the visible object with the specified object name, where the parameters offsetX and offsetY refer to the distance the object will travel from its current location, and the method returns the newly created GwxLocation 279 object on success, or NULL if the operation failed. (See also GwxLocation 279 and GwxDynamic 270). IDispatch* CreateRotationDynamic(BSTR visibleObjectName, BSTR dynamicObjectName, float startAngle, float endAngle, float pivotX, float pivotY, boolean clockwise, boolean dial, boolean tracking, short numberOfDetents, boolean continuousUpdate), which creates a GwxRotation 280 object with the specified attributes and attaches it to the visible object with the specified object name, and where the parameters pivotX and pivotY are offsets from the center of the object, and angles are specified in degrees, and the method returns the newly created GwxRotation 280 object on success, or NULL if the operation failed. (See also GwxRotation 280 and GwxDynamic 270); IDispatch* CreateHideDynamic(BSTR visibleObjectName, BSTR dynamicObjectName, boolean hideWhenTrue, boolean disableObject), which creates a GwxHide 282 object with the specified attributes and attaches it to the visible object with the specified object name, and returns the newly created GwxHide 282 object on success, or NULL if the operation failed. (See also GwxHide 282 and GwxDynamic 270). IDispatch* CreateFlashDynamic(BSTR visibleObjectName, BSTR dynamicObjectName, boolean hideobject, boolean flashWhenTrue, boolean altStateWhenOff, boolean changeFill, boolean changeLine, boolean changeShadow, OLE_COLOR altFillColor, OLE_COLOR altLineColor, OLE_COLOR altShadowColor), which creates a GwxFlash 281 object with the specified attributes and attaches it to the visible object with the specified object name, and returns the newly created GwxFlash 281 object on success, or NULL if the operation failed (See also GwxFlash 281 and GwxDynamic 270); IDispatch* CreateAnalogColorDynamic(BSTR visibleObjectName, BSTR dynamicObjectName, boolean changeFill, boolean changeLine, boolean changeShadow, OLE_COLOR startFillColor, OLE_COLOR endFillColor, OLE_COLOR startLineColor, OLE_COLOR endLineColor, OLE_COLOR startShadowColor, OLE_COLOR endShadowColor, boolean defaultColorAbove, boolean defaultColorBelow), which creates a GwxAnalogColor 276 object with the specified attributes and attaches it to the visible object with the specified object name, and returns the newly created GwxAnalogColor 276 object on success, or NULL if the operation failed (See also GwxAnalogColor 276 and GwxDynamic 270); IDispatch* CreateDigitalColorDynamic(BSTR visibleObjectName, BSTR dynamicObjectName, boolean changeColorWhenTrue, boolean changeFill, boolean changeLine, boolean changeShadow, long fillColor, long lineColor, long shadowColor, BSTR dataSource), which creates a GwxDigitalColor 273 object with the specified attributes and attaches it to the visible object with the specified object name, with one initial data connection, although additional data connections can be added by calling this function again for the same visible object, which returns the newly created GwxDigitalColor 273 object on success, NULL if the operation failed (See also GwxDigitalColor 273, GwxDigitalColorInfo 274, and GwxDynamic 270); IDispatch* CreatePickDynamic(BSTR visibleObjectName, BSTR dynamicObjectName, GWXPICKACTION pickAction, GWXBUTONTYPE pickType, GWXEXECUTIONTRIGGER executionTrigger, GWXMOUSEBUTTON mouseButton, boolean initiallySelected, BSTR groupName, BSTR fileName, boolean modal, boolean center, BSTR value1, BSTR value2, BSTR value3), which creates a GwxPick 283 object with the specified attributes and attaches it to the visible object with the specified object name, where valid values for GWXPICKACTION are PickLoadDisplay, PickDragDropLoad, PickPopupWindow, PickDownloadValue, PickToggleValue, PickLaunchApp, PickClose,and PickRunScript, and where valid values for GWXBUTTONTYPE are ButtonNormal, ButtonCheck, and ButtonRadio, and where valid values for GWXEXECUTIONTRIGGER are TriggerOnDown, TriggerWhileDown, TriggerOnDnWhileDn, TriggerOnUp, TriggerOnDnOnUp, TriggerWhileDnOnUp, and TriggerOnDnWhileDnOnUp, and valid values for GWXMOUSEBUTTON are MouseButtonLeft, MouseButtonMiddle, and MouseButtonRight, which returns the newly created GwxPick 283 object on success, or NULL if the operation failed, and depending upon the value of pickAction, some parameters may be ignored by GraphWorX32 (See also GwxPick 283 and GwxDynamic 270); IDispatch* CreateButton(long buttonType, float x, float y, BSTR label, GWXTEXTALIGNMENT alignment, boolean stretchText, boolean isFilled, long fillColor, long lineColor, long lineWidth, long lineStyle, boolean hasShadow, long shadowColor, long edgeStyle, boolean isHidden, BSTR objectName), which creates and returns a GwxButton 252 object with the specified attributes, in the current display, but the button object will be non-operational until a GwxPick 283 object is attached to it (See also GwxButton 252, GwxPick 283, GwxDynamic 270, GwxText 251, and GwxVisible 250); IDispatch* CreateTimedate(BSTR textObjectName, BSTR dynamicObjectName, long formatType, BSTR timeFormat, BSTR dateFormat), which creates a GwxTimeDate 285 object with the specified attributes and attaches it to the GwxText 251 object with the specified object name, and returns the newly created GwxTimeDate 285 object on success, or NULL if the operation failed (See also GwxTimeDate 285, GwxText 251, GwxVisible 250, and GwxDynamic 270); IDispatch* CreateProcessPoint(BSTR textObjectName, BSTR dynamicObjectName, GWXDATATYPE dataType, boolean update, boolean dataEntry, boolean hasInitialValue, VARIANT initialValue, BSTR format), which creates a GwxProcessPoint 284 object with the specified attributes and attaches it to the GwxText 251 object with the specified object name, and returns the newly created GwxProcessPoint 284 object on success, or NULL if the operation failed (See also GwxProcessPoint 284, GwxText 251, GwxVisible 250, and GwxDynamic 270); IDispatch* CreateAnimator(BSTR symbolName, BSTR dynamicObjectName, boolean animateWhenTrue, boolean visibleWhenOff, boolean currentFrameWhenOff), which creates a GwxAnimator 277 object with the specified attributes and attaches it to the GwxSymbol 259 object with the specified object name, and returns the newly created GwxAnimator 277 object on success, or NULL if the operation failed (See also GwxAnimator 277, GwxSymbol 259, GwxVisible 250, and GwxDynamic 270); IDispatch* CreateAnalogSelector(BSTR symbolName, BSTR dynamicObjectName, boolean hiddenWhenAbove, boolean hiddenWhenBelow), which creates a GwxAnalogSelector 275 object with the specified attributes and attaches it to the GwxSymbol 259 object with the specified object name, and returns the newly created GwxAnalogSelector 275 object on success, or NULL if the operation failed (See also GwxAnalogSelector 275, GwxSymbol 259, GwxVisible 250, and GwxDynamic 270); IDispatch* CreateDigitalSelector(BSTR symbolName, BSTR dynamicObjectName), which creates a GwxDigitalSelector 271 object with the specified attributes and attaches it to the GwxSymbol 259 object with the specified object name, and returns the newly created GwxDigitalSelector 271 object on success, or NULL if the operation failed, but the newly created object has no data connections, which may be added by use of GwxDigitalSelector::SetConnectionInfo (See also GwxDigitalSelector 271, GwxDigitalSelectorInfo 272, GwxSymbol 259, GwxVisible 250, and GwxDynamic 270).

Events are special messages which are sent from an ActiveX control to the container in which it is inserted. Events can correspond to such occurrences as a key press or a mouse click, a timer message, the completion of a task, or some other occurrence. In one embodiment of the present invention, the ActiveX control can send information to its container using the following events.

void DisplayLoad( ) is an event which is fired just after a display is loaded into GraphWorX32; void DisplayUnload( ) is an event which is fired just before a display is unloaded from GraphWorX32 (i.e. just prior to loading a new display into GraphWorX32 or prior to closing GraphWorX32); void PreRuntimeStart( ) is an event which is fired just before GraphWorX32 is put into runtime mode; void PostRuntimeStart( ) is an event which is fired when GraphWorX32 has finished entering runtime mode; void PreRuntimeStop( ) is an event which is fired just before GraphWorX32 exits runtime mode; void PostRuntimeStop( ) is an event which is fired after GraphWorX32 has completely exited runtime mode; void PreAnimateDisplay( ) is an event which is fired just before GraphWorX32 animates a display, which is the process of requesting the tags from the OPC server(s); void PostAnimateDisplay( ) is an event which is fired after GraphWorX32 has finished animating a display; void PreDeanimateDisplay( ) is an event which is fired just before GraphWorX32 deanimates a display, which is the process of releasing the tags previously requested from the OPC server (s); void PostDeanimateDisplay( ) is an event which is fired after GraphWorX32 has finished deanimating a display; void MouseDown(long Button, long Shift, float X, float Y) is an event which is fired when a mouse button is clicked within the GraphWorX32 window, where valid values for Button are Left button is pressed, Right button is pressed, and Middle button is pressed, and valid values for Shift are No Key is pressed, SHIFT key is pressed, CTRL key is pressed, and ALT key is pressed, and the parameters X and Y indicate the position of the mouse relative to the upper-left corner of the window when the mouse was clicked; void MouseUp (long Button, long Shift, float X, float Y) is an event that is fired when a mouse button is released; void DblClick(long Button, long Shift, float X, float Y) is an event that is fired when a mouse button is double clicked within the GraphWorX32 window; void MouseMove(long Button, long Shift, float X, float Y) is an event that is fired when the mouse is moved within the GraphWorX32 window, where the parameter Button is zero if no mouse buttons are currently pressed during the move; void KeyDown(long KeyCode, long Shift) is an event that is fired when a keyboard key is pressed while the GraphWorX32 window has focus; and void KeyUp(long KeyCode, long Shift) is an event that is fired when a keyboard key is released.

GwxVisible 250 is the base object type for objects in a GraphWorX32 display that can be seen. All visible GraphWorX32 objects (i.e., GwxText 251, GwxButton 252, GwxRectangle 253, GwxArc 254, GwxLine 255, GwxEllipse 256, GwxBitmap 257, GwxMetafile 258, GwxSymbol 259 and GwxOleObject 260) are derived from GwxVisible 250 and consequently inherit all the properties and methods of GwxVisible 250.

The properties of GwxVisible 250 are described below: boolean visible, which is TRUE if the object is visible, and FALSE is the object is hidden; OLE_COLOR FillColor, which gets and sets the visible object's fill color; boolean IsFilled, which is TRUE if the object is filled, and FALSE if the object is not filled; OLE_COLOR LineColor, which gets and sets the visible object's line/border color; OLE_COLOR ShadowColor, which gets and sets the visible object's shadow color; boolean HasShadow, which is TRUE if the object has a shadow, and FALSE if the object does not have a shadow; long LineWidth, a value in the range of 1 to 10 which defines the width of an object's line/border; GWXLINESTYLE LineStyle, which defines the style of the object's line/border, and the valid values for GWXLINESTYLE are LineSolid, LineDash,LineDot, LineDashDot, LineDashDotDot, and LineNone; GWX3DEDGESTYLE EdgeStyle, which defines the 3-D edge style of the object's border, and for which valid values are EdgeNone, EdgeRaised, EdgeEtched, EdgeBump, and EdgeSunken; float Angle, which gets and sets the rotation angle of the object, which angle is specified in degrees; BSTR ObjectName, which gets and sets the object name of a visible object, wherein the embodiment of GraphWorX32 will insure that object names are unique by appending a number to the object name, for example, if there are multiple objects named "tank" and another is added, "tank" would become "tank1", "tank1" would become "tank2", etc.; BSTR UserDescription, which is a string used to describe the visible object; BSTR UserCustomData, which is a string used to store custom data; BSTR Keyword, which is a string used to store a keyword; and boolean Selected, which is TRUE if the object is selected, and FALSE if the object is not selected, but which is only available to be changed in configure mode.

The methods associated with GwxVisible 250 are described below:

Some methods only work for objects that are top level visible objects. These include:

void MoveObject(float offsetx, float offsety), is a method that only works for objects that are top level visible objects, and moves the object by the specified offsets; void SetObjectDimensions(float left, float top, float width, float height) is a method that sets the object's size and location; and void StretchObject(float scaleX, float scaleY, float anchorX, float anchorY), a method that stretches the object based on the specified scale factors, which are values such that 0.0 is 0% and 1.0 is 100%, where a pair of anchor values are used to change the way the object shifts position during stretching. For example, to resize an object from its center, the anchor values should be the center coordinates of the object.

Other methods have more general applicability, and include:

void RefreshObject( ) is a method that causes the visible object to be redrawn; void GetObjectDimensions(float* left, float* top, float* width, float* height), a method that gets the object's size and location; boolean SetAliasDefinition (BSTR aliasName, BSTR newDefinition), a method that sets the alias definition for all dynamic objects associated with this visible object, which is recursively applied to all objects grouped within the symbol, if this GwxVisible 250 is also a GwxSymbol 259, and returns FALSE if no matching alias names were found, and TRUE otherwise (See also GwxDisplay::SetAliasDefinition and GwxDynamic::SetAliasDefinition); IDispatch* GetDynamicObjectFromName(BSTR nameSubstring), a method that gets the dynamic object with the specified name (or portion of a name), which is attached to this visible object; IDispatch* GetDynamicObjectFromIndex(long index), a method that gets the dynamic object with the specified zero-based index, which is attached to this visible object, and which is useful for iterating through all the dynamic objects attached to this visible object; and long GetNumberOfDynamics( ) is a method that returns the number of dynamic objects attached to this visible object.

Turning to the objects associated with GwxVisible 250, the GwxVisible 250 derived object types GwxText 251, GwxButton 252, GwxRectangle 253, GwxArc 254, GwxLine 255, GwxEllipse 256, GwxBitmap 257, GwxMetafile 258, GwxSymbol 259, and GwxOleObject 260 are described, along with the methods and properties associated with each object.

GwxText 251 has all the properties and methods of GwxVisible 250, plus the additional properties described below. BSTR Text is a string that is the text that is displayed by the text object. The property boolean StretchText is TRUE if the font size should be resized when the text object is stretched, and FALSE if the font size should remain the same when the object is stretched. The property GWXTEXTALIGNMENT Alignment is only significant for multiline text strings and defines the alignment of the text (left, center, right), and can take the valid values TextAlignLeft, TextAlignCenter, and TextAlignRight. The property IFontDisp* Font gets and sets the font of the text object.

A GwxButton 252 object is not fully functional until it has at least one GwxPick 283 dynamic object associated with it. GwxButton 252 has all the properties and methods of GwxVisible 250 and GwxText 251.

GwxRectangle 253 has all the properties and methods of GwxVisible 250, plus the additional properties described next The property boolean Rounded defines the state of the corners of a rectangle, which is returned as the value TRUE, if the rectangle has rounded corners, and which causes the rectangle to be given rounded corners with the default rounding settings when this property is set to TRUE. The properties long RoundingX and long RoundingY get and set the amount of horizontal and vertical rounding of the rectangle's corners, respectively.

GwxArc 254 has all the properties and methods of GwxVisible 250, plus the additional properties described below. The property GWXARCTYPE ArcType get and sets the arc type of the arc, using the valid values of ArcArc, ArcPie, and ArcChord. The properties float StartAngle and float EndAngle get and set the start and end angles of an arc, respectively, expressed in degrees.

GwxLine 255, GwxEllipse 256, GwxBitmap 257 and GwxMetafile 258 each have all the properties and methods of GwxVisible 250.

GwxSymbol 259 is used to group together a collection of GwxVisible 250 derived objects. GwxSymbol 259 objects can be used to group other GwxSymbol 259 objects, allowing nested groupings. GwxSymbol 259 has all the properties and methods of GwxVisible 250, plus the additional methods described below.

The methods of GwxSymbol 259 include those described below. The method boolean PushCurrentSymbol( ) pushes the current symbol object onto the symbol edit stack. This essentially makes the objects grouped in this symbol top level visible objects, which is important because some operations, like GwxVisible::SetObjectDimensions are only allowed on top level objects. The method IDispatch* GetVisibleObjectFromName(BSTR nameSubstring) gets the visible object with the specified name, or portion of a name, which is an immediate child of this symbol. IDispatch* GetVisibleObjectFromIndex(long index) is a method that gets the visible object with the specified zero-based index, which is an immediate child of this symbol, which is useful for iterating through all the immediate child objects grouped in this symbol. Finally, long GetNumberOfChildVisibles( ) is a method that returns the number of immediate child objects grouped in this symbol.

GwxOleObject 260 has all the properties and methods of GwxVisible 250, plus the additional method described below. IDispatch* GetOLEObject( ) is a method that gets the actual OLE object wrapped by GwxOleObject 260.

GwxDynamic 270 is the base object type for objects in a GraphWorX32 display that perform a dynamic transformation on an associated visible object. For example, a GwxSize 278 object associated with a GwxRectangle 253 object would change the size of the rectangle based on the OPC data value associated with the GwxSize 278 object. All dynamic GraphWorX32 objects (i.e. GwxDigitalSelector 271, GwxDigitalSelectorInfo 272, GwxDigitalColor 273, GwxDigitalColorInfo 274, GwxAnalogSelector 275, GwxAnalogColor 276, GwxAnimator 277, GwxSize 278, GwxLocation 279, GwxRotation 280, GwxFlash 281, GwxHide 282, GwxPick 283, GwxProcessPoint 284, and GwxTimeDate 285) are derived from GwxDynamic 270 and consequently inherit all the properties and methods of GwxDynamic 270. Dynamic objects are not visible themselves; they exist to act upon the visual properties of an associated GwxVisible 250 derived object. A GwxVisible 250 object can have many GwxDynamic 270 objects associated with it, but a specific GwxDynamic 270 object has only one associated GwxVisible 250 object.

GwxDynamic 270 is the object type from which dynamic GraphWorX32 objects are derived. All dynamic GraphWorX32 objects have the properties and methods of GwxDynamic 270. The features of a GwxDynamic 270-derived object which are dynamic may represent either analog data such as size, location, rotation, and other analog properties (GwxAnalogSelector 275, GwxAnalogColor 276, GwxSize 278, GwxLocation 279, GwxRotation 280, GwxProcessPoint 284), or digital data such as turning a display object on or off (i.e., GwxFlash 281, or GwxHide 282, which can make an object visible or invisible, and enabled or disabled), or both. The properties of GwxDynamic 270 are discussed below.

A number of properties are meaningful only for analog variables, and are ignored for dynamics which are based on digital connections. These include boolean RangeOverride, BSTR HighRange and BSTR LowRange. The property boolean RangeOverride, which gets and sets the range override status of an object, and uses the values true and false. When boolean RangeOverride is FALSE, GraphWorX32 will use the ranges associated with the primary DataSource, and when it is TRUE, GraphWorX32 will use the ranges defined in the HighRange and LowRange properties. The properties BSTR HighRange and BSTR LowRange represent respectively the overridden high and low ranges for a GwxDynamic 270-derived object. HighRange and LowRange are strings which represent an OPC tag name, an expression, a constant value, or a GraphWorX32 local variable.

The property BSTR DataSource represents the primary data source for a dynamic object. DataSource is a string which represents an OPC tag name, an expression, a constant value, or a GraphWorX32 local variable. The property long TimerRate represents the frequency update rate for timer based dynamic types, and is ignored for dynamics which are not timer based. Timer based dynamics include: GwxAnimator 277, GwxFlash 281, and GwxPick 283. The property BSTR ObjectName gets and sets the object name of a dynamic object. The object name is used to identify the object when using certain OLE Automation methods (i.e., GwxDisplay::GetDynamicObjectFromName). GraphWorX32 will insure that object names are unique, by appending numbers to object names, if necessary. The property BSTR UserDescription represents a description string for the dynamic object, which is typically displayed as informational text in a tooltip. The property BSTR UserCustomData represents a string that is used to store custom data, and may be used to associate any additional data with the dynamic object.

The methods associated with GwxDynamic 270 or a GwxDynamic-derived object are described below. The method boolean SetAliasDefinition(BSTR aliasName, BSTR newDefinition) sets the alias definition only for the dynamic object that uses it, returning FALSE if no matching alias names were found, and TRUE otherwise. (See also GwxDisplay::SetAliasDefinition and GwxVisible::SetAliasDefinition). The method IDispatch* GetVisibleObject( ) gets the visible object to which the GwxDynamic 270 is attached.

The GraphWorX32 objects derived from GwxDynamic 270, namely, GwxDigitalSelector 271, GwxDigitalSelector1Info 272, GwxDigitalColor 273, GwxDigitalColorInfo 274, GwxAnalogSelector 275, GwxAnalogColor 276, GwxAnimator 277, GwxSize 278, GwxLocation 279, GwxRotation 280, GwxFlash 281, GwxHide 282, GwxPick 283, GwxProcessPoint 284, and GwxTimeDate 285, are described, and their properties and methods are presented, below.

The GwxDigitalSelector 271 object is used to hide or show individual objects from a set of objects based on a digital (boolean) signal. A GwxDigitalSelector 271 object is only associated with a GwxSymbol 259 object, which itself defines a set of objects upon which the GwxDigitalSelector 271 object acts. GwxDigitalSelector 271 has all the properties and methods of GwxDynamic 270, plus the additional method boolean SetConnectionInfo(short objectNumber, BSTR dataSource, boolean showWhenTrue), which sets data connections for this digital selector object. The parameter objectNumber is a zero-based index representing an immediate child of the GwxSymbol 259 object to which the GwxDigitalSelector 271 is attached. The GwxDigitalSelectorInfo 272 object is reserved for future use, which may include properties of individual data connections for GwxDigitalSelector 271 objects.

The GwxDigitalColor 273 object is used to change the color of the associated visible object based on one or more digital or boolean signals. GwxDigitalColor 273 has all the properties and methods of GwxDynamic 270. The GwxDigitalColorInfo 274 object is reserved for future use, which may include properties of individual data connections GwxDigitalColor 273 objects.

The GwxAnalogSelector 275 object is used to hide or show individual objects from a set of objects based on an analog signal. A GwxAnaloglSelector object is only associated with a GwxSymbol 259 object, which itself defines a set of objects upon which the GwxDigitalSelector 271 object acts. GwxAnalogSelector 275 has all the properties and methods of GwxDynamic 270.

The GwxAnalogColor 276 object is used to change the color of the associated visible object based on an analog signal. GwxAnalogColor 276 has all the properties and methods of GwxDynamic 270.

The GwxAnimator 277 object is used to hide or show individual objects from a set of objects in a specified sequence, based on elapsed time. The GwxAnimator 277 is activated/or deactivated based on the value of a digital signal. A GwxAnimator 277 object is only associated with a GwxSymbol 259 object, which itself defines a set of objects upon which the GwxDigitalSelector 271 object acts. GwxAnimator 277 has all the properties and methods of GwxDynamic 270.

The GwxSize 278 object is used to change the size of the associated visible object based on the value of an analog signal. GwxSize 278 has all the properties and methods of GwxDynamic 270.

The GwxLocation 279 object is used to change the location of the associated visible object based on the value of an analog signal. GwxLocation 279 has all the properties and methods of GwxDynamic 270.

The GwxRotation 280 object is used to change the angle of the associated visible object based on the value of an analog signal. GwxRotation 280 has all the properties and methods of GwxDynamic 270.

The GwxFlash 281 object is used to toggle the color or visibility of the associated visible object at a specified rate. The GwxFlash 281 object is activated or deactivated based on the value of a digital signal. GwxFlash 281 has all the properties and methods of GwxDynamic 270.

The GwxHide 282 object is used to toggle the visibility or enabled/disabled state of the associated visible object based on the value of a digital signal. The GwxHide 282 has all the properties and methods of GwxDynamic 270.

Associating a GwxPick 283 object with a visible object designates that the associated visible object will perform an active when clicked on by the operator during runtime mode. GwxPick 283 objects can be associated with GwxButton 252 objects to make fully functional pushbuttons. GwxPick 283 has all the properties and methods of GwxDynamic 270.

GwxProcessPoint 284 objects are associated with GwxText 251 objects to create alphanumeric display fields and data entry fields. A process point is used to show and/or download the value of an associated signal (analog, digital, or string). GwxProcessPoint 284 has all the properties and methods of GwxDynamic 270.

GwxTimeDate 285 objects are associated with GwxText 251 objects to create fields which display the current time and/or date. GwxTimeDate 285 has all the properties and methods of GwxDynamic 270.

GwxPoint 290 is the base object type for objects in a GraphWorX32 display that reference OPC data, expressions, local variables, or constant values. Each GwxDynamic 270 object may have one or more GwxPoint 290 objects associated with it. GwxPoint 290 objects are created and destroyed by GwxDynamic 270 objects as needed. GwxPoint 290 is the object type which GraphWorX32 uses to represent data connections. If several GwxDynamic 270 objects are connected to the same data source, they reference a single shared GwxPoint 290 object. GwxPoint 290 objects handle OPC tags, expressions, constant values, and GraphWorX32 local variables. GwxPoint 290 objects cannot be explicitly created or destroyed. GraphWorx32 automatically manages the lifetimes of GwxPoint 290 objects based on the data source connections of the GwxDynamic 270 objects in the display.

The properties and methods of GwxPoint 290 are described below. GwxPoint 290 has the property VARIANT Value which is the current data value of this point object. This property gets updated with new values during runtime mode. The properties VARIANT HighRange and VARIANT LowRange represent respectively the High range and Low range values associated with a GwxPoint 290 object. The property GWXDATATYPE DataType represents the data type of a GwxPoint 290 object. Valid values for GWXDATATYPE are DataTypeShort, DataTypeLong, DataTypeFloat, DataTypeDouble, DataTypeString, DataTypeBool, and DataTypeByte. The method BSTR GetPointName( ) gets the point name (e.g., a string representing a data source) of a GwxPoint 290 object.

Figure 7:
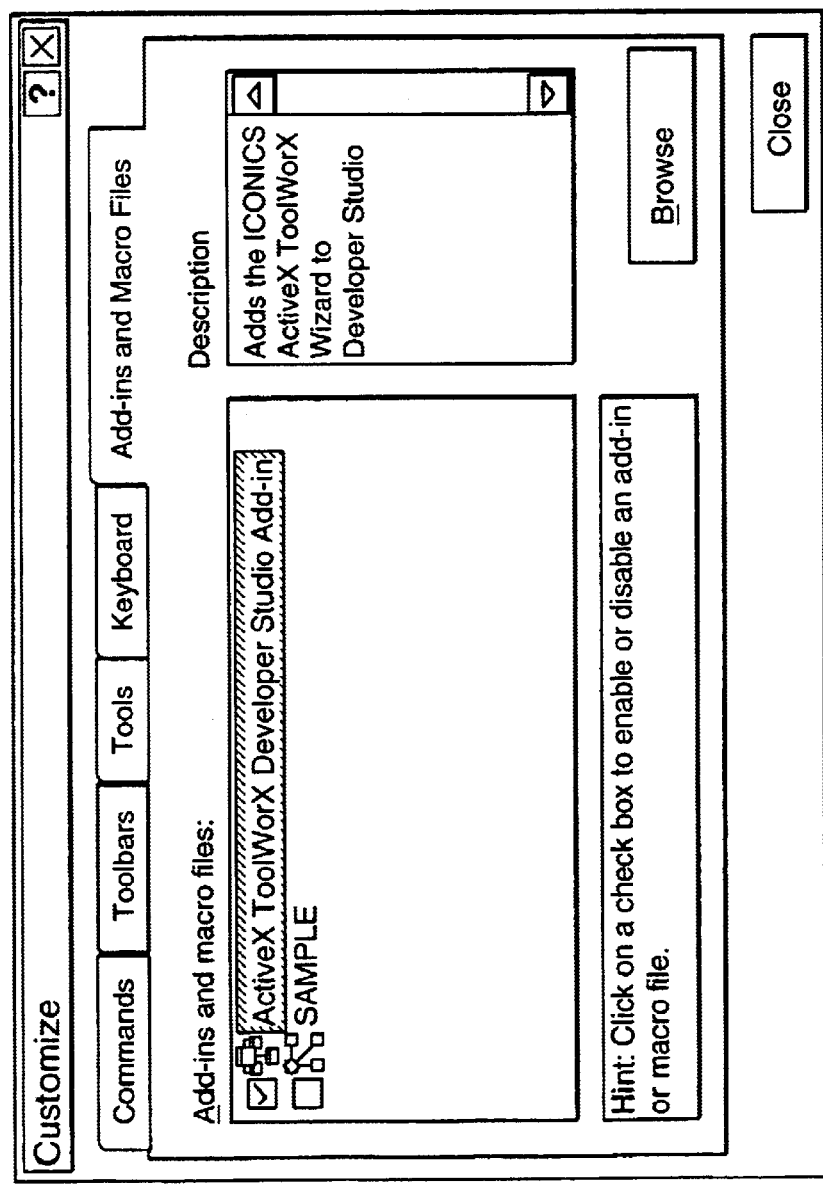
FIG. 7 is a screen displayed during the production of a software object according to the invention.

FIG. 7 depicts an embodiment of a step in the creation of a software object according to the present invention. In one embodiment, an environment which may be used in creating real-time interactive control and communication software object is the Microsoft Developer Studio ("MDS"). FIG. 7 depicts the screen view 100 of a computer which has been activated to run MDS wherein the "Customize" dialog box has been activated. In the embodiment, the ICONICS ActiveX ToolWorX Developer Studio Add-in is present, and the user has selected this Add-in. Upon activation of the Add-in, an automation tool, the ICONICS ActiveX ToolWorX Wizard is made available, which provides automation features in the creation of software objects, in particular ActiveX objects.

Figure 8:
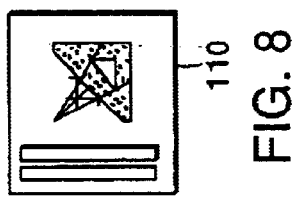
FIG. 8 depicts a toolbar button which is used to invoke automated features in the production of a software object according to the invention.

FIG. 8 depicts an embodiment of a toolbar button 110 which is used to invoke the automated features in the creation of a software object according to the present invention. This toolbar button 110 appears on the toolbar in the MDS, and it may be used to activate the ICONICS ActiveX ToolWorX Wizard.

In general, a Wizard is an executable program which embodies sufficient knowledge and experience to automate some series of steps which a user of sufficient expertise could carry out by issuing a series of commands. Often, the knowledge required to carry out the steps which a Wizard automates is well beyond that of one of ordinary skill in the software arts. Duplication of the behavior of a Wizard may require the issuance of a multitude of discrete commands, any one of which, if entered incorrectly or in the wrong sequence, could cause the process to fail. Wizards of various types are well known in the software arts. For example, many vendors provide specific Wizards which may be used to install software or configure hardware automatically. It is by no means common to find Wizards which are used to create software. Having added the ICONICS ActiveX ToolWorX Developer Studio Add-in and having installed the ICONICS ActiveX ToolWorX Wizard, one can then activate the Wizard by using the toolbar button 110 depicted in FIG. 8.

Figure 9:
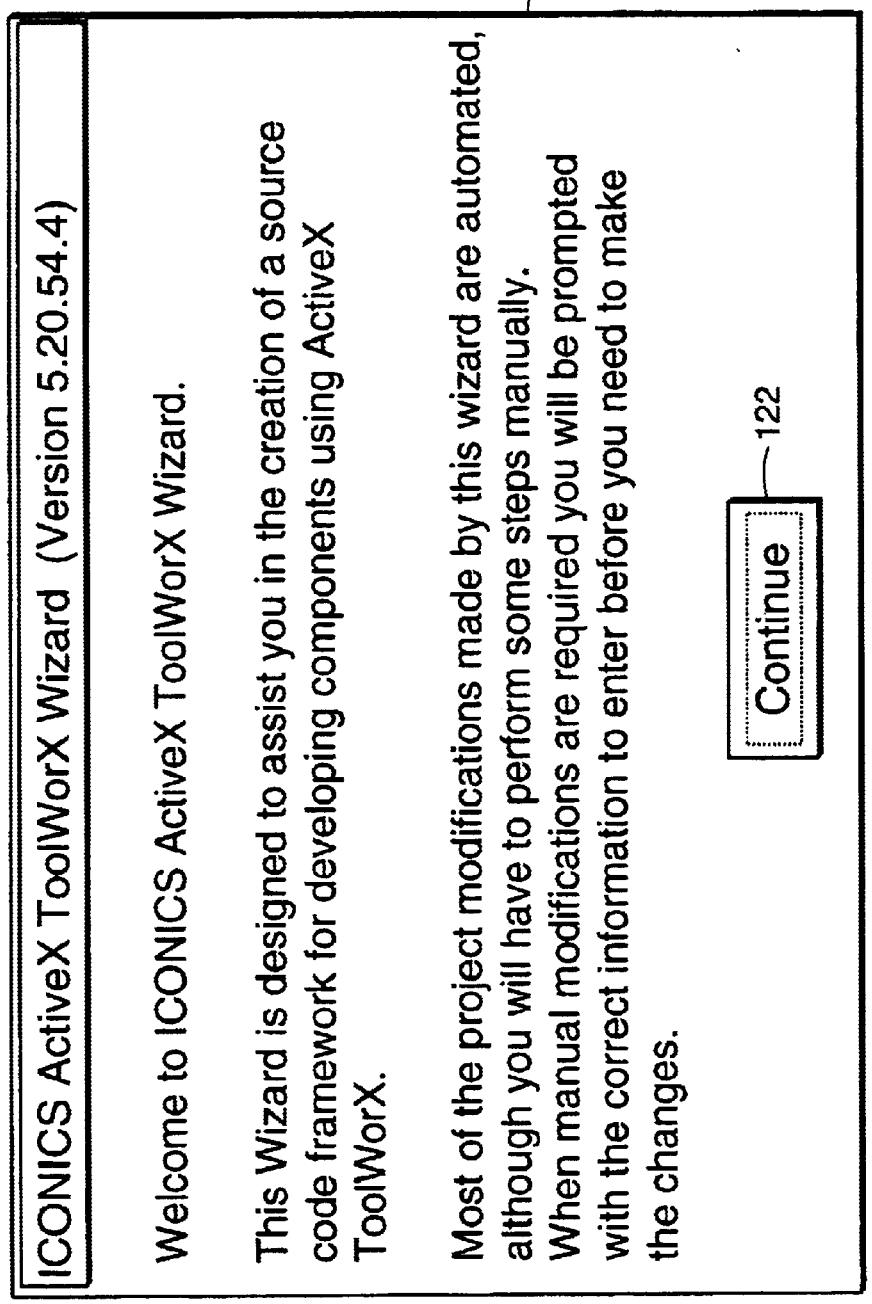
FIG. 9 is a screen displayed during the production of a software object according to the invention.

FIG. 9 depicts an embodiment of a step in the creation of a software object according to the present invention. In one embodiment, upon activating the Wizard, a first information dialog box 120 appears, which is depicted in FIG. 9. This dialog box provides information to the user which is designed to make clear the operation of the automated process of creating a real-time interactive control and communication software object. After reviewing this material, the user activates button 122, marked "Continue . . . " by activating a pointing device attached to the computer or the "Enter" key on a computer keyboard.

Figure 10:
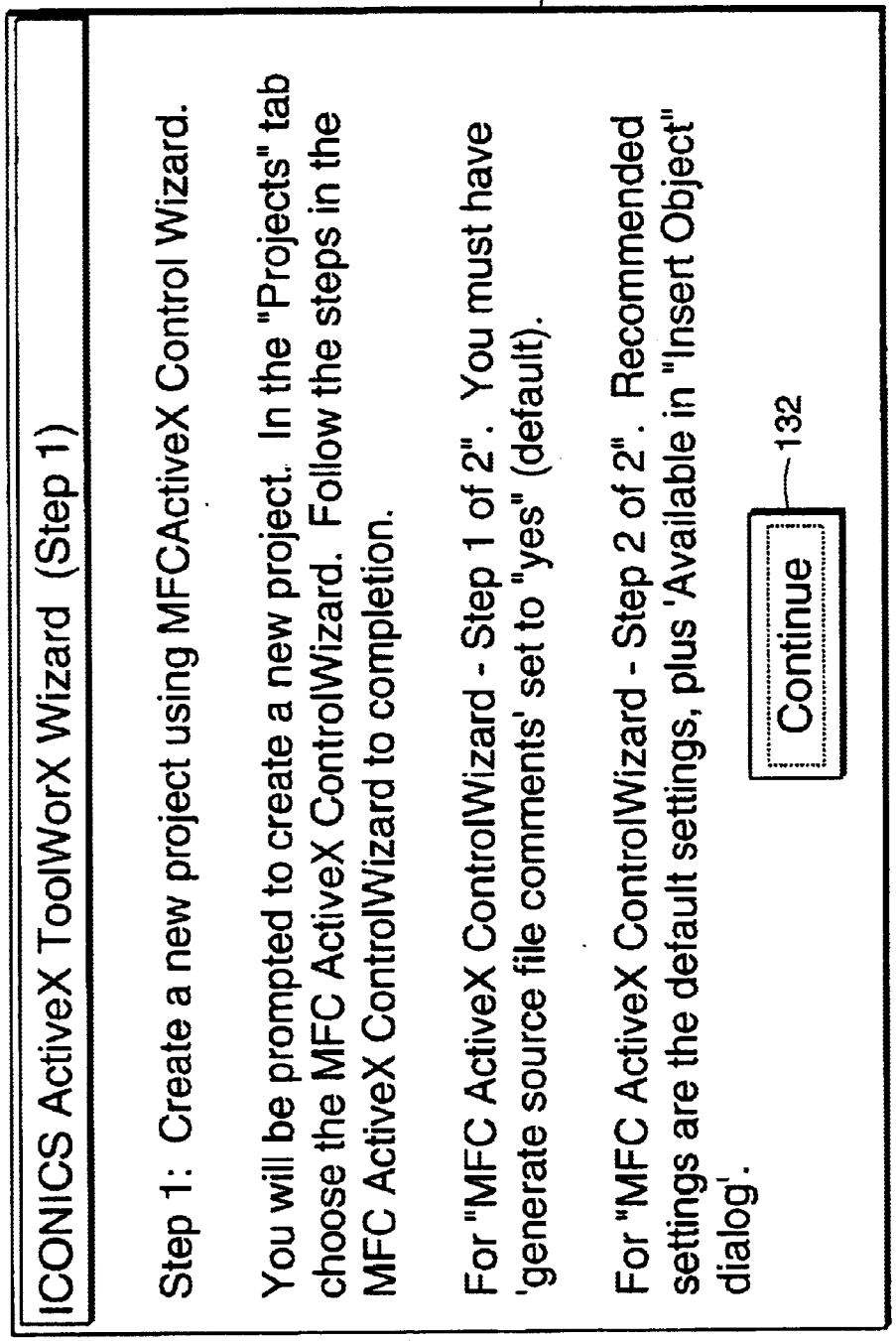
FIG. 10 is a screen displayed during the production of a software object according to the invention.

FIG. 10 depicts an embodiment of a step in the creation of a software object according to the present invention. In one embodiment, a second information dialog box 130 appears, which is depicted in FIG. 10. This dialog box provides information to the user which is designed to make clear the operation of the automated process of creating a real-time interactive control and communication software object. After reviewing this material, the user activates button 132, marked "Continue . . . " by activating a pointing device attached to the computer or the "Enter" key on a computer keyboard. In one embodiment, the ICONICS ActiveX ToolWorX Wizard then prompts the user to create a new project in Visual C++ using the MFC ActiveX Control Wizard.

Figure 11:
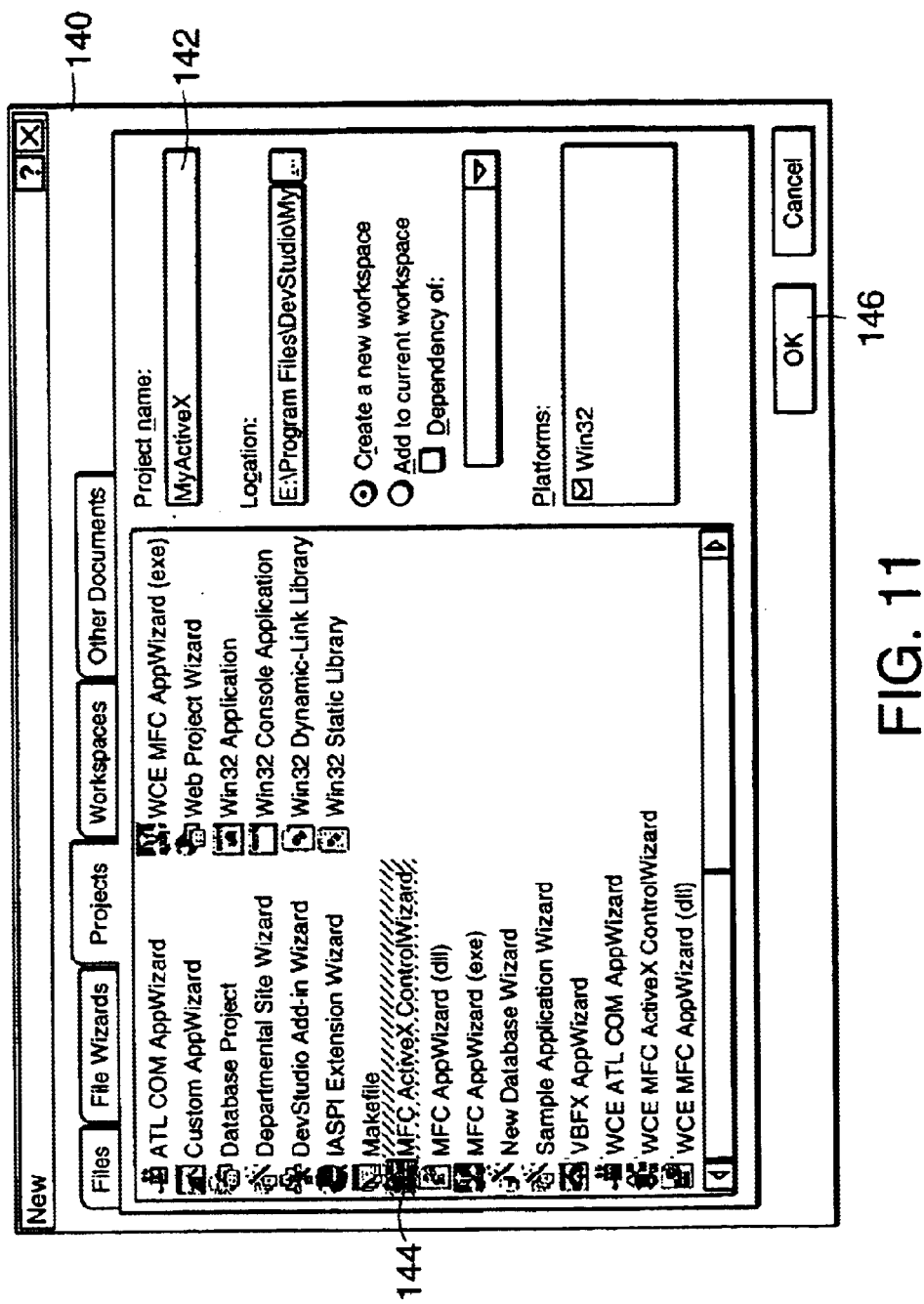
FIG. 11 is a screen displayed during the production of a software object according to the invention.

FIG. 11 depicts an embodiment of a step in the creation of a software object according to the present invention, which represents a dialog box 140. The user has been instructed by the information presented in the embodiment represented by FIG. 10 to select and enter a name for the new project in the appropriate location 142 of the dialog box. The user has been further instructed to select the MFC ActiveX Control Wizard 144. The user has been instructed to activate the box 146, labeled "OK," by activating a pointing device attached to the computer or the "Enter" key on a computer keyboard when all of the required acts have been completed.

FIG. 12 depicts an embodiment of a step in the creation of a software object according to the present invention. In one embodiment, the MFC ActiveX Control Wizard has been activated, and dialog box 150 appears. The user has been instructed by the material presented in FIG. 10 to select the button 152 indicating the choice of the reply "yes" to the question "Would you like source file comments to be generated?" The user then selects the button 154 marked "Next" by activating a pointing device attached to the computer or the "Enter" key on a computer keyboard when all of the required acts have been completed.

Figure 13:
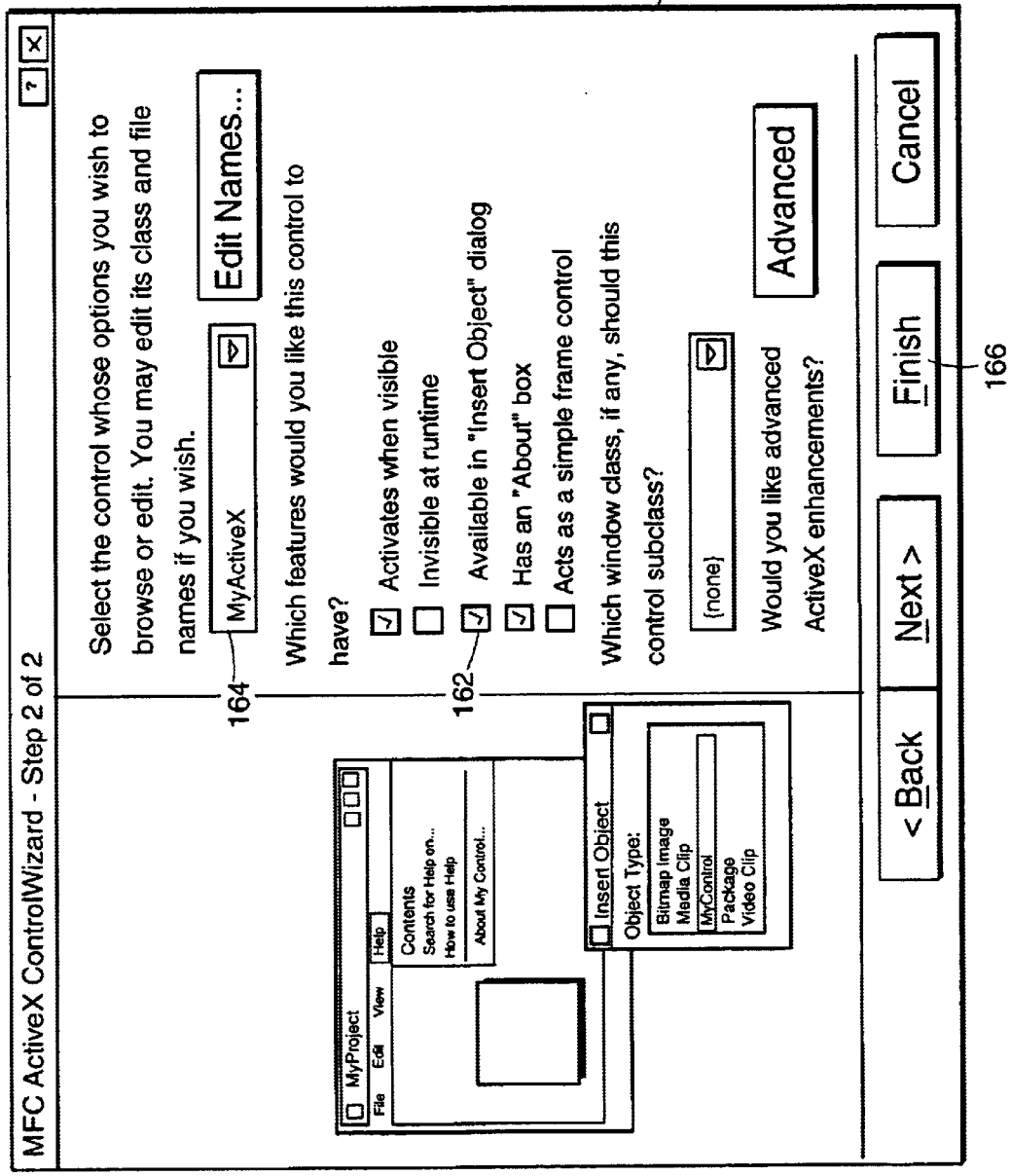
FIG. 13 is a screen displayed during the production of a software object according to the invention.

FIG. 13 depicts an embodiment of a step in the creation of a software object according to the present invention. In one embodiment, the MFC ActiveX Control Wizard has been activated, and dialog box 160 appears. The user has been instructed by the material presented in FIG. 10 to check the box 162 indicating selection of the choice 'Available in "Insert Object" dialog.' The user should check location 164 to make sure that the correct control is being edited. The user then selects the button 166 marked "Finish" by activating a pointing device attached to the computer or the "Enter" key on a computer keyboard when all of the required acts have been completed.

Figure 14:
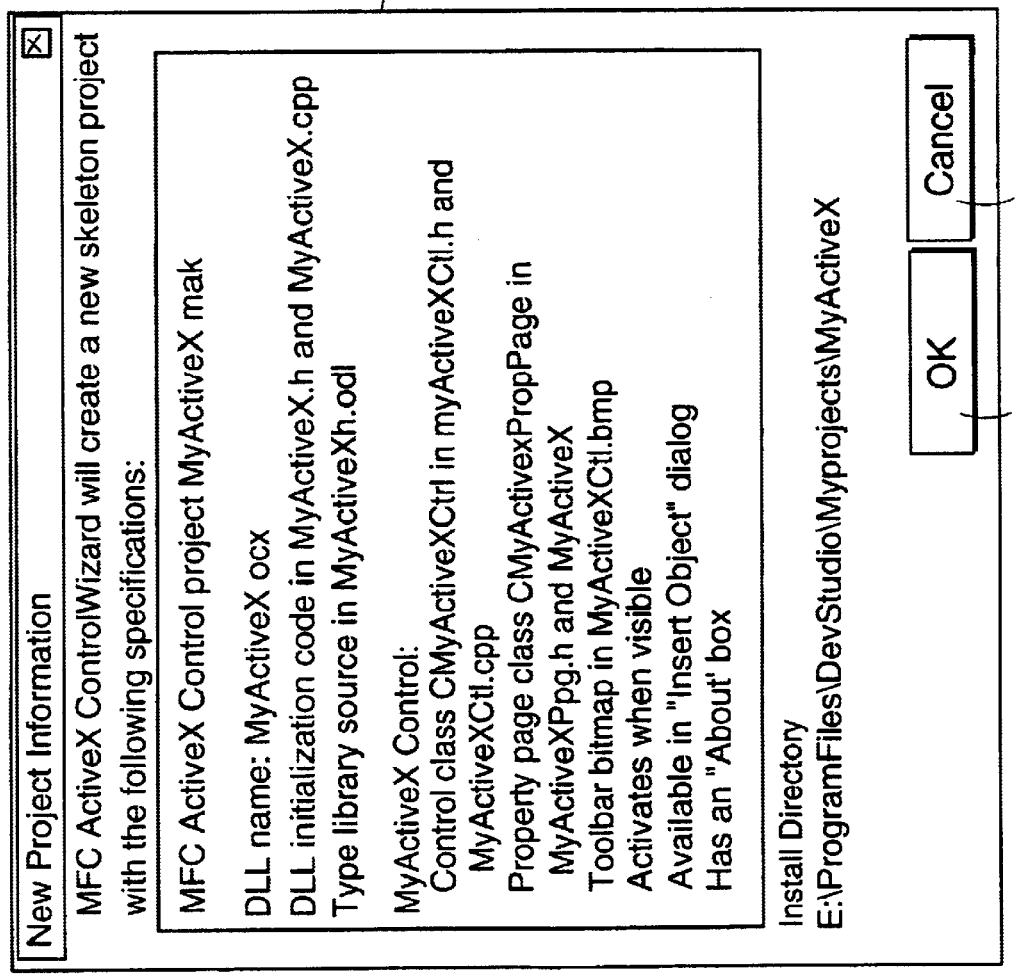
FIG. 14 is a screen displayed during the production of a software object according to the invention.

FIG. 14 depicts an embodiment of a step in the creation of a software object according to the present invention. In one embodiment, the MFC ActiveX Control Wizard has been activated, and dialog box 170 appears. After reviewing the information presented to check that the appropriate project name has been assigned and the appropriate project attributes have been selected, the user activates button 172 marked "OK" by activating a pointing device attached to the computer or the "Enter" key on a computer keyboard. In the event that the user determines that an error has occurred, the project can be abandoned by activating the button 174 marked "Cancel" by activating a pointing device attached to the computer or the "Enter" key on a computer keyboard, and the project can be restarted.

In one embodiment, the ICONICS ActiveX ToolWorX Wizard then copies the following toolkit files into the new project directory:

Control.h—the class definition for CGwxControl

Gwx32.tlb—type library containing definitions of GraphWorX32 objects

Rlease\GwxExtDll.lib—LIB file for the GraphWorX32 MFC extension DLL release)

Debug\GwxExtDlld.lib—LIB file for the GraphWorX32 MFC extension DLL debug)

Release\GwxExtDll.dll—the GraphWorX32 MFC extension DLL (release)

Debug\GwxExtDlld.dll—the GraphWorX32 MFC extension DLL (debug)

Release\olexpress.dll—used by GwxExtDll.dll for OPC data communications (release)

Debug\olexpressd.dll—used by GwxExtDlld.dll for OPC data communications (debug)

In Build-Setting-Link-Release GWXExtDll.LIB is added.

In Build-Setting-Link-Debug GWXExtDlld.LIB is added.

The ICONICS ActiveX ToolWorX Wizard then changes the control class to be derived from CGwxControl instead of COleControl. Specifically, the wizard ensures the replacement of all instances of the name COleControl in the control class in the .cpp file and .h file. The ICONICS ActiveX ToolWorX Wizard also includes Control.h in the .h file of the control class and in the .cpp file of the application class. The wizard replaces the default drawing code in OnDraw( ) with CGwxControl::OnDraw(pdc, rcBounds, rcInvalid). In InitInstance( ), just before returning, the ICONICS ActiveX ToolWorX Wizard adds the code InitializeGraphWorXExtensionDll( ). This function is required to ensure that MFC properly handles the current module state.

In one embodiment, it has been observed that Microsoft Class Wizard has no support to automatically handle inheritance for derived controls. Therefore, it is necessary to edit the ODL file of the ActiveX control which is being created, in order to inherit the properties and method of the base class CGwxControl. The ActiveX ToolWorX Wizard inserts the available properties into the ODL file in commented out format. To enable inheritance of a particular property, the user must uncomment the appropriate line in the ODL file. In an embodiment which inherits all the base class properties, the properties section of the ODL file would appear as follows:

properties:

//NOTE—ClassWizard will maintain property information here.

//Use extreme caution when editing this section.

//{{AFX_ODL_PROP(CTestocxCtrl)

//}}AFX_ODL_PROP

[id(DISPID_BORDERSTYLE), bindable, requestedit] short BorderStyle;

[id(DISPID_APPEARANCE), bindable, requestedit] short Appearance;

[id(0x10001)] BSTR DisplayName;

[id(0x10002)] boolean UseAmbientBackColor;

[id(0x10003)] boolean AutoStartRuntime;

[id(0x10004)] boolean OverrideScrollbarSettings;

[id(0x10005)] boolean VerticalScrollbar;

[id(0x10006)] boolean HorizontalScrollbar;

In one embodiment, the user may make the same modifications for the methods section which would then appear as follows:

methods:

//NOTE—ClassWizard will maintain method information here.

//Use extreme caution when editing this section.

//{{AFX_ODL_METHOD(CTestocxCtrl)

//}}AFX_ODL_METHOD

[id(0x10007)] void StartRuntime( );

[id(0x10008)] void StopRuntime( );

[id(0x10009)] IDispatch* GetDisplay ( );

In one embodiment, the ActiveX ToolWorX Wizard will then ask the user to optionally insert an initial GraphWorX32 display. Selecting "yes" for this question will prompt the user to browse for the display file to be inserted into the project. Alternatively, the user may manually insertion of GraphWorX32 displays. Selecting "no" for this question will proceed to the next step of the ActiveX ToolWorX Wizard.

FIG. 15 depicts an embodiment of a step in the creation of a software object according to the present invention. In one embodiment, the ActiveX ToolWorX Wizard then presents the user with another informational dialog box 180, and prompts the user to insert two files which contain useful wrapper classes, Gwx32.cpp and Gwx32.h, into the project. After reviewing the information presented, the user activates button 182 marked "Continue . . . " by activating a pointing device attached to the computer or the "Enter" key on a computer keyboard.

Figure 16:
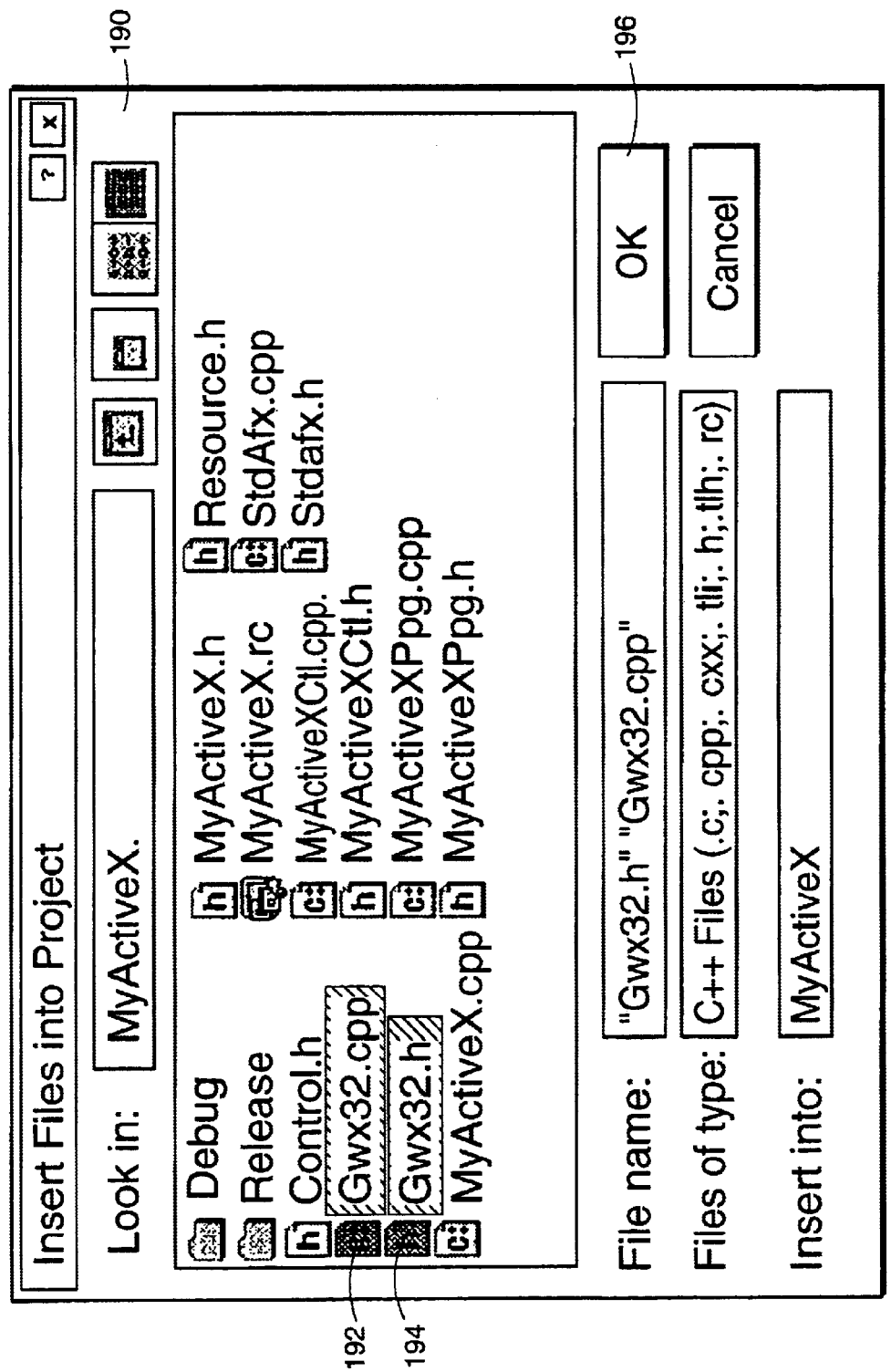
FIG. 16 is a screen displayed during the production of a software object according to the invention.

FIG. 16 depicts an embodiment of a step in the creation of a software object according to the present invention. In one embodiment, the ActiveX ToolWorX Wizard then presents the user with another interactive dialog box 190. The user may select two files, Gwx32.cpp 192 and Gwx32.h 194, for inclusion in the project. After reviewing the information presented to check that the appropriate project name has been assigned and the appropriate files have been selected, the user activates button 196 marked "OK" by activating a pointing device attached to the computer or the "Enter" key on a computer keyboard.

In one embodiment, the ActiveX ToolWorX Wizard then includes the header file of these new wrapper classes the in the header file of the control class. The wizard also defines a new member variable, m_pIGwx32, in the control class and initializes this variable in the constructor of the control as follows:

LPDISPATCH lpDispatch=GetDisplay( );
m_pIGwx32=new IGwx32(lpDispatch);

This member is deleted in the destructor of the control class.

In one embodiment, using Microsoft Class Wizard, the user can create additional wrapper classes for other object types defined in Gwx32.TLB as needed, such as IGwxRectangle. It is a good idea to comment out unused members of the wrapper class when development of the ActiveX control is completed to reduce the overall size of the compiled OCX file.

In one embodiment, the user may override the default settings of properties in the base class, by changing them to the desired values in the constructor of the control class.

In one embodiment, including the code:
m_verticalScrollbar=TRUE;
m_horizontalScrollbar=TRUE;

will turn on the scrollbars by default in the control. In one embodiment, the ActiveX ToolWorX Wizard inserts the available overrides into the constructor of the control class, commented out.

In one embodiment, the real-time interactive control and communication software object code is compiled at this point. In another embodiment, the real-time interactive control and communication software object code is interpreted. In yet another embodiment, some of the real-time interactive control and communication software object code is compiled and some is interpreted.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of creating one or more real-time interactive control and communication software objects for use in connection with a computer and a machine which communicate according to a standard communication protocol for process control, the method comprising:

producing a display module which displays a graphical representation of a user interface of the machine on a display of the computer;

associating the graphical representation of the user interface with at least one control signal;

producing a control module to examine the graphical representation of the user interface and the associated control signal;

producing a communication module to communicate the associated control signal using the standard communication protocol for process control;

producing a framework module to interconnect functionally the display module, the control module, and the communication module; and creating the one or more real-time interactive control and communication software objects by merging the framework module, the display module, the control module, and the communication module, wherein the one or more real-time interactive control and communication software objects comprise ActiveX control objects.

2. The method of claim 1 wherein the step of producing the communication module comprises producing the communication module to communicate using the standard communication protocol for process control which comprises the Object linking and embedding for Process Control (OPC) protocol.

3. The method of claim 1 wherein the step of producing the control module comprises producing the control module to examine the graphical representation of the user interface and the associated control signal periodically.

4. The method of claim 1 wherein the step of producing the control module comprises producing the control module to examine the graphical representation of the user interface and the associated control signal when a change in the graphical representation of the user interface is detected.

5. The method of claim 1 wherein the step of producing the control module comprises producing the control module to examine the graphical representation of the user interface and the associated control signal when a change in the associated control signal is detected.

6. The method of claim 1 wherein at least one of the producing steps comprises utilizing a pre-fabricated software module.

7. The method of claim 1 wherein the step of producing the display module comprises producing the display module which displays the graphical representation of the user interface of the machine utilizing a pre-fabricated software image of the graphical representation.

8. The method of claim 1 wherein the creating step comprises compiling the framework module into a compiled module and linking the compiled module with the display module, the control module, and the communication module.

9. The method of claim 1 wherein the creating step comprises interpreting the framework module, the display module, the control module, and the communication module.

10. A computer-readable medium on which is stored a computer program for creating one or more real-time interactive control and communication software objects for use in connection with a computer and a machine which communicate according to a standard communication protocol for process control, the computer program comprising instructions, which, when executed by a computer, perform the steps of:

producing a display module which displays a graphical representation of a user interface of the machine on a display of the computer;

associating the graphical representation of the user interface with at least one control signal;

producing a control module to examine the graphical representation of the user interface and the associated control signal;

producing a communication module to communicate the associated control signal using the standard communication protocol for process control;

producing a framework module to interconnect functionally the display module, the control module, and the communication module; and creating the one or more real-time interactive control and communication software objects by merging the framework module, the display module, the control module, and the communication module, wherein the one or more real-time interactive control and communication software objects comprise ActiveX control objects.

11. The computer-readable medium of claim 10, wherein the communication module communicates using the Object linking and embedding for Process Control (OPC) protocol.

12. The computer-readable medium of claim 10, wherein the control module examines the graphical representation of the user interface and the associated control signal periodically.

13. The computer-readable medium of claim 10, wherein the control module examines the graphical representation of the user interface and the associated control signal when a change in the graphical representation of the user interface is detected.

14. The computer-readable medium of claim 10, wherein the control module examines the graphical representation of the user interface and the associated control signal when a change in the associated control signal is detected.

15. The computer-readable medium of claim 10 wherein the display module utilizes a pre-fabricated software image of the graphical representation.

16. The computer-readable medium of claim 10 wherein the framework module is compiled and linked with the display module, the control module, and the communication module to create the one or more real-time interactive control and communication software objects.

17. The computer-readable medium of claim 10 wherein the framework module, the display module, the control module, and the communication module are interpreted to create the one or more real-time interactive control and communication software objects.

* * * * *